(12) United States Patent
Choi et al.

(10) Patent No.: US 12,501,531 B2
(45) Date of Patent: Dec. 16, 2025

(54) LIGHTING EFFECT DIRECTING METHOD OF DIRECTION OBJECT BASED ON OBJECT ORIGIN

(71) Applicant: FANLIGHT CO., LTD., Seoul (KR)

(72) Inventors: Kyung Il Choi, Seoul (KR); Jung Min Choi, Seoul (KR); Hyun Gil Kim, Seoul (KR)

(73) Assignee: FANLIGHT CO., LTD., Seoul (KR)

( * ) Notice: Subject to any disclaimer, the term of this patent is extended or adjusted under 35 U.S.C. 154(b) by 140 days.

(21) Appl. No.: 18/427,177

(22) Filed: Jan. 30, 2024

(65) Prior Publication Data

US 2024/0172350 A1 May 23, 2024

Related U.S. Application Data

(63) Continuation of application No. PCT/KR2022/012280, filed on Aug. 17, 2022.

(30) Foreign Application Priority Data

Aug. 17, 2021 (KR) .................. 10-2021-0108342

(51) Int. Cl.
*H05B 47/165* (2020.01)
*H05B 47/155* (2020.01)
(Continued)

(52) U.S. Cl.
CPC ......... *H05B 47/165* (2020.01); *H05B 47/155* (2020.01); *H05B 47/1985* (2024.01); *H05B 47/19* (2020.01)

(58) Field of Classification Search
CPC .............. H05B 47/165; H05B 47/155; H05B 47/1985; H05B 47/19; H05B 47/105; H05B 45/20; Y02B 20/40; A63J 5/02
See application file for complete search history.

(56) References Cited

U.S. PATENT DOCUMENTS 10,387,700 B2  8/2019  Lee et al.
10,509,930 B2  12/2019 Lee et al.
(Continued)

FOREIGN PATENT DOCUMENTS

JP  2015-002958 A  1/2015
JP  2017-157549 A  9/2017
(Continued)

OTHER PUBLICATIONS

An Office Action mailed by the Korean Intellectual Property Office on May 19, 2023, which corresponds to Korean Patent Application No. 10-2021-0108342 with English language translation.
(Continued)

*Primary Examiner* — Raymond R Chai
(74) *Attorney, Agent, or Firm* — Studebaker Brackett PLLC

(57) ABSTRACT

Disclosed is a lighting effect directing method of a receiving device. The lighting effect directing method of a receiving device includes determining coordinates of the receiving device at a seat based on seat information thus received, receiving and storing object data including a predefined direction shape and at least one expression level set to correspond to a size of the direction shape, and predefined color data, receiving a control packet including object information indicating the direction shape, an object origin of the direction shape, and the at least one expression level, and color information indicating a light emission color, determining a location relationship between the object origin and the determined coordinates of the receiving device, based on the object information, and performing a corresponding light emission operation such that the direction shape is expressed at the at least one expression level, based on the location relationship and the color information.

11 Claims, 23 Drawing Sheets

(51) Int. Cl.
H05B 47/175 (2020.01)
H05B 47/19 (2020.01)

(56) References Cited

U.S. PATENT DOCUMENTS

| | | | |
|---|---|---|---|
| 10,762,315 B2 | 9/2020 | Lee et al. | |
| 11,350,258 B2 | 5/2022 | Lee et al. | |
| 2017/0249489 A1 | 8/2017 | Lee et al. | |
| 2018/0049287 A1* | 2/2018 | Lu | H05B 47/155 |
| 2019/0325181 A1 | 10/2019 | Lee et al. | |
| 2019/0394860 A1* | 12/2019 | Choi | H05B 47/1985 |
| 2020/0117865 A1 | 4/2020 | Lee et al. | |
| 2020/0337143 A1* | 10/2020 | Jo | H05B 47/155 |
| 2020/0342191 A1 | 10/2020 | Lee et al. | |
| 2022/0124898 A1 | 4/2022 | Choi | |
| 2022/0264273 A1 | 8/2022 | Lee et al. | |
| 2023/0117158 A1* | 4/2023 | Choi | H05B 47/105 315/129 |

FOREIGN PATENT DOCUMENTS

| KR | 10-2009-0129136 A | 12/2009 |
|---|---|---|
| KR | 10-2015-0055938 A | 5/2015 |
| KR | 10-1730301 B1 | 4/2017 |
| KR | 10-2017-0142156 A | 12/2017 |
| KR | 10-2018-0015703 A | 2/2018 |
| KR | 10-2020-0050449 A | 5/2020 |
| KR | 10-2020-0133316 A | 11/2020 |
| KR | 10-2021-0119335 A | 10/2021 |

OTHER PUBLICATIONS

An Office Action mailed by the Korean Intellectual Property Office on Dec. 22, 2023, which corresponds to Korean Patent Application No. 10-2021-0108342 with English language translation.
An Office Action; "Notice of Reasons for Refusal," mailed by the Japanese Patent Office on Jan. 23, 2024, which corresponds to Japanese Patent Application No. 2023-510483 with partial English language translation.
International Search Report issued in PCT/KR2022/012280; mailed Nov. 14, 2022.

* cited by examiner

FIG. 4

|    | 1 | 2 | 3 | 4 | 5 | 6 | 7 | 8 | 9 | 10 | 11 | 12 | 13 | 14 | 15 | 16 | 17 | 18 | 19 | 20 |
|----|---|---|---|---|---|---|---|---|---|----|----|----|----|----|----|----|----|----|----|----|
| 20 |   |   |   |   | 5 |   |   |   |   | 5  |    |    |    |    | 5  |    |    |    |    |    |
| 19 | 5 |   |   |   |   | 5 |   |   |   | 5  |    |    |    | 5  |    |    |    |    | 5  |    |
| 18 |   | 5 |   |   |   | 5 |   |   |   | 5  |    |    |    | 5  |    |    |    | 5  |    |    |
| 17 |   |   | 5 |   |   |   | 5 |   |   | 5  |    |    | 5  |    |    |    | 5  |    |    |    |
| 16 |   |   |   | 5 |   |   |   |   |   |    |    |    |    |    |    | 5  |    |    |    |    |
| 15 |   |   |   |   |   |   | 4 | 4 |   |    |    | 4  | 4  |    |    |    |    |    |    |    |
| 14 |   |   |   |   |   | 4 | 4 | 3 | 4 |    | 4  | 3  | 4  | 4  |    |    |    |    |    |    |
| 13 | 5 | 5 | 5 | 5 |   | 4 | 3 | 3 | 2 | 4  | 2  | 3  | 3  | 4  |    | 5  | 5  | 5  | 5  |    |
| 12 |   |   |   |   |   | 4 | 3 | 2 | 1 | 2  | 1  | 2  | 3  | 4  |    |    |    |    |    |    |
| 11 |   |   |   |   |   | 4 | 3 | 2 | 1 | 0  | 1  | 2  | 3  | 4  |    |    |    |    |    |    |
| 10 |   |   | 5 | 5 |   | 4 | 3 | 2 | 1 | 1  | 1  | 2  | 3  | 4  |    | 5  | 5  |    |    |    |
| 9  | 5 | 5 |   |   |   |   | 4 | 3 | 2 | 1  | 2  | 3  | 4  |    |    |    |    | 5  | 5  |    |
| 8  |   |   |   |   |   |   |   | 4 | 3 | 2  | 3  | 4  |    |    |    |    |    |    |    |    |
| 7  |   |   |   | 5 |   |   |   | 4 | 3 | 4  |    |    |    |    | 5  |    |    |    |    |    |
| 6  |   |   | 5 |   |   |   |   |   | 4 |    |    |    |    |    |    | 5  |    |    |    |    |
| 5  |   | 5 |   |   |   | 5 |   |   |   |    |    |    | 5  |    |    |    |    | 5  |    |    |
| 4  | 5 |   |   |   |   | 5 |   |   |   | 5  |    |    | 5  |    |    |    |    |    | 5  |    |
| 3  |   |   |   |   |   |   | 5 |   |   | 5  |    |    | 5  |    |    |    |    |    |    |    |
| 2  |   |   |   |   | 5 |   |   |   |   | 5  |    |    |    |    | 5  |    |    |    |    |    |
| 1  |   |   |   |   |   |   |   |   |   | 5  |    |    |    |    |    |    |    |    |    |    |

SCENE1

FIG. 6

| | Object information | | | | Color information | | | | |
|---|---|---|---|---|---|---|---|---|---|
| | Object number | Reference coordinates | | Expression level | Expression level1 | Expression level2 | Expression level3 | Expression level4 | Expression level5 |
| Hexadecimal number | 0x01 | 0x0A | 0x0A | 0x05 | | | | | |
| Decimal number | 1 | 10 | 10 | 5 | Yellow | Orange | Red | Wine color | Black |
| Number of data | 1 | 2 | 3 | 4 | 5 | 6 | 7 | 8 | 9 |

PACKET1a spans all columns.

FIG. 15

| | | Object information | | | | |
|---|---|---|---|---|---|---|
| | | Object number | Reference coordinates | Expression level | Magnification | Rotation |
| PACKET1b | Hexadecimal number | 0x01 | 0x0A | 0x0A | 0x05 | 0~255 | 0~255 |
| | Decimal number | 1 | 10 | 10 | 5 | | |
| | Number of data | 1 | 2 | 3 | 4 | 5 | 6 |
| | | Color information | | | | |
| | | Expression level1 | Expression level2 | Expression level3 | Expression level4 | Expression level5 |
| | Hexadecimal number | Yellow | Orange | Red | Wine color | Black |
| | Decimal number | | | | | |
| | Number of data | 7 | 8 | 9 | 10 | 11 |

FIG. 16

| V | ... | 123 | 124 | 125 | 126 | 127 | 128 | 129 | 130 | 131 | 132 |
|---|-----|-----|-----|-----|-----|-----|-----|-----|-----|-----|-----|
| M | ... | 0.6times | 0.7times | 0.8times | 0.9times | 1times Original size | 1.1times | 1.2times | 1.3times | 1.4times | 1.5times |

V: Value
M: Magnification

FIG. 17

| Indication value | Angle (Deg) | Sin value | Indication value | Angle (Deg) | Sin value | Indication value | Angle (Deg) | Sin value | Indication value | Angle (Deg) | Sin value | Indication value | Angle (Deg) | Sin value | Indication value | Angle (Deg) | Sin value |
|---|---|---|---|---|---|---|---|---|---|---|---|---|---|---|---|---|---|
| 0 | 0 | 0.000 | 30 | 45 | 0.707 | 60 | 90 | 1.000 | 90 | 135 | 0.707 | 120 | 180 | 0.000 | 150 | 225 | -0.707 |
| 1 | 1.5 | 0.026 | 31 | 46.5 | 0.725 | 61 | 91.5 | 1.000 | 91 | 136.5 | 0.688 | 121 | 181.5 | -0.026 | 151 | 226.5 | -0.725 |
| 2 | 3 | 0.052 | 32 | 48 | 0.743 | 62 | 93 | 0.999 | 92 | 138 | 0.669 | 122 | 183 | -0.052 | 152 | 228 | -0.743 |
| 3 | 4.5 | 0.078 | 33 | 49.5 | 0.760 | 63 | 94.5 | 0.997 | 93 | 139.5 | 0.649 | 123 | 184.5 | -0.078 | 153 | 229.5 | -0.76 |
| 4 | 6 | 0.105 | 34 | 51 | 0.777 | 64 | 96 | 0.995 | 94 | 141 | 0.629 | 124 | 186 | -0.105 | 154 | 231 | -0.777 |
| 5 | 7.5 | 0.131 | 35 | 52.5 | 0.793 | 65 | 97.5 | 0.991 | 95 | 142.5 | 0.609 | 125 | 187.5 | -0.131 | 155 | 232.5 | -0.793 |
| 6 | 9 | 0.156 | 36 | 54 | 0.809 | 66 | 99 | 0.988 | 96 | 144 | 0.588 | 126 | 189 | -0.156 | 156 | 234 | -0.809 |
| 7 | 10.5 | 0.182 | 37 | 55.5 | 0.824 | 67 | 100.5 | 0.983 | 97 | 145.5 | 0.566 | 127 | 190.5 | -0.182 | 157 | 235.5 | -0.824 |
| 8 | 12 | 0.208 | 38 | 57 | 0.839 | 68 | 102 | 0.978 | 98 | 147 | 0.545 | 128 | 192 | -0.208 | 158 | 237 | -0.839 |
| 9 | 13.5 | 0.233 | 39 | 58.5 | 0.853 | 69 | 103.5 | 0.972 | 99 | 148.5 | 0.522 | 129 | 193.5 | -0.233 | 159 | 238.5 | -0.853 |
| 10 | 15 | 0.259 | 40 | 60 | 0.866 | 70 | 105 | 0.966 | 100 | 150 | 0.500 | 130 | 195 | -0.259 | 160 | 240 | -0.866 |
| 11 | 16.5 | 0.284 | 41 | 61.5 | 0.879 | 71 | 106.5 | 0.959 | 101 | 151.5 | 0.477 | 131 | 196.5 | -0.284 | 161 | 241.5 | -0.879 |
| 12 | 18 | 0.309 | 42 | 63 | 0.891 | 72 | 108 | 0.951 | 102 | 153 | 0.454 | 132 | 198 | -0.309 | 162 | 243 | -0.891 |
| 13 | 19.5 | 0.334 | 43 | 64.5 | 0.903 | 73 | 109.5 | 0.943 | 103 | 154.5 | 0.431 | 133 | 199.5 | -0.334 | 163 | 244.5 | -0.903 |
| 14 | 21 | 0.358 | 44 | 66 | 0.914 | 74 | 111 | 0.934 | 104 | 156 | 0.407 | 134 | 201 | -0.358 | 164 | 246 | -0.914 |
| 15 | 22.5 | 0.383 | 45 | 67.5 | 0.924 | 75 | 112.5 | 0.924 | 105 | 157.5 | 0.383 | 135 | 202.5 | -0.383 | 165 | 247.5 | -0.924 |
| 16 | 24 | 0.407 | 46 | 69 | 0.934 | 76 | 114 | 0.914 | 106 | 159 | 0.358 | 136 | 204 | -0.407 | 166 | 249 | -0.934 |
| 17 | 25.5 | 0.431 | 47 | 70.5 | 0.943 | 77 | 115.5 | 0.903 | 107 | 160.5 | 0.334 | 137 | 205.5 | -0.431 | 167 | 250.5 | -0.943 |
| 18 | 27 | 0.454 | 48 | 72 | 0.951 | 78 | 117 | 0.891 | 108 | 162 | 0.309 | 138 | 207 | -0.454 | 168 | 252 | -0.951 |
| 19 | 28.5 | 0.477 | 49 | 73.5 | 0.959 | 79 | 118.5 | 0.879 | 109 | 163.5 | 0.284 | 139 | 208.5 | -0.477 | 169 | 253.5 | -0.959 |
| 20 | 30 | 0.500 | 50 | 75 | 0.966 | 80 | 120 | 0.866 | 110 | 165 | 0.259 | 140 | 210 | -0.500 | 170 | 255 | -0.966 |
| 21 | 31.5 | 0.522 | 51 | 76.5 | 0.972 | 81 | 121.5 | 0.853 | 111 | 166.5 | 0.233 | 141 | 211.5 | -0.522 | 171 | 256.5 | -0.972 |
| 22 | 33 | 0.545 | 52 | 78 | 0.978 | 82 | 123 | 0.839 | 112 | 168 | 0.208 | 142 | 213 | -0.545 | 172 | 258 | -0.978 |
| 23 | 34.5 | 0.566 | 53 | 79.5 | 0.983 | 83 | 124.5 | 0.824 | 113 | 169.5 | 0.182 | 143 | 214.5 | -0.566 | 173 | 259.5 | -0.983 |
| 24 | 36 | 0.588 | 54 | 81 | 0.988 | 84 | 126 | 0.809 | 114 | 171 | 0.156 | 144 | 216 | -0.588 | 174 | 261 | -0.988 |
| 25 | 37.5 | 0.609 | 55 | 82.5 | 0.991 | 85 | 127.5 | 0.793 | 115 | 172.5 | 0.131 | 145 | 217.5 | -0.609 | 175 | 262.5 | -0.991 |
| 26 | 39 | 0.629 | 56 | 84 | 0.995 | 86 | 129 | 0.777 | 116 | 174 | 0.105 | 146 | 219 | -0.629 | 176 | 264 | -0.995 |
| 27 | 40.5 | 0.649 | 57 | 85.5 | 0.997 | 87 | 130.5 | 0.760 | 117 | 175.5 | 0.078 | 147 | 220.5 | -0.649 | 177 | 265.5 | -0.997 |
| 28 | 42 | 0.669 | 58 | 87 | 0.999 | 88 | 132 | 0.743 | 118 | 177 | 0.052 | 148 | 222 | -0.669 | 178 | 267 | -0.999 |
| 29 | 43.5 | 0.688 | 59 | 88.5 | 1.000 | 89 | 133.5 | 0.725 | 119 | 178.5 | 0.026 | 149 | 223.5 | -0.688 | 179 | 268.5 | -1.000 |

| Indication value | Angle (Deg) | Sin value | Indication value | Angle (Deg) | Sin value |
|---|---|---|---|---|---|
| 180 | 270 | -1.000 | 210 | 315 | -0.707 |
| 181 | 271.5 | -1.000 | 211 | 316.5 | -0.688 |
| 182 | 273 | -0.999 | 212 | 318 | -0.669 |
| 183 | 274.5 | -0.997 | 213 | 319.5 | -0.649 |
| 184 | 276 | -0.995 | 214 | 321 | -0.629 |
| 185 | 277.5 | -0.991 | 215 | 322.5 | -0.609 |
| 186 | 279 | -0.988 | 216 | 324 | -0.588 |
| 187 | 280.5 | -0.983 | 217 | 325.5 | -0.566 |
| 188 | 282 | -0.978 | 218 | 327 | -0.545 |
| 189 | 283.5 | -0.972 | 219 | 328.5 | -0.522 |
| 190 | 285 | -0.966 | 220 | 330 | -0.500 |
| 191 | 286.5 | -0.959 | 221 | 331.5 | -0.477 |
| 192 | 288 | -0.951 | 222 | 333 | -0.454 |
| 193 | 289.5 | -0.943 | 223 | 334.5 | -0.431 |
| 194 | 291 | -0.934 | 224 | 336 | -0.407 |
| 195 | 292.5 | -0.924 | 225 | 337.5 | -0.383 |
| 196 | 294 | -0.914 | 226 | 339 | -0.358 |
| 197 | 295.5 | -0.903 | 227 | 340.5 | -0.334 |
| 198 | 297 | -0.891 | 228 | 342 | -0.309 |
| 199 | 298.5 | -0.879 | 229 | 343.5 | -0.284 |
| 200 | 300 | -0.866 | 230 | 345 | -0.259 |
| 201 | 301.5 | -0.853 | 231 | 346.5 | -0.233 |
| 202 | 303 | -0.839 | 232 | 348 | -0.208 |
| 203 | 304.5 | -0.824 | 233 | 349.5 | -0.182 |
| 204 | 306 | -0.809 | 234 | 351 | -0.156 |
| 205 | 307.5 | -0.793 | 235 | 352.5 | -0.131 |
| 206 | 309 | -0.777 | 236 | 354 | -0.105 |
| 207 | 310.5 | -0.76 | 237 | 355.5 | -0.078 |
| 208 | 312 | -0.743 | 238 | 357 | -0.052 |
| 209 | 313.5 | -0.725 | 239 | 358.5 | -0.026 |

SCENE3a

SCENE3b

SCENE4b

FIG. 22

SCENE4c

LIGHTING EFFECT DIRECTING METHOD OF DIRECTION OBJECT BASED ON OBJECT ORIGIN

CROSS-REFERENCE TO RELATED APPLICATIONS

The present application is a continuation of International Patent Application No. PCT/KR2022/012280, filed on Aug. 17, 2022, which is based upon and claims the benefit of priority to Korean Patent Application No. 10-2021-0108342 filed on Aug. 17, 2021. The disclosures of the above-listed applications are hereby incorporated by reference herein in their entirety.

BACKGROUND

Embodiments of the inventive concept described herein relate to a method in which a receiving device or a lighting control system directs an lighting effect of a direction object based on an object origin, and a method in which the lighting control system directs the lighting effect.

In general, a light emitting device (or a lighting device) refers to a device that achieves the purpose of lighting by reflecting, refracting, and transmitting light from a light source. The light emitting device may be classified into an indirect light emitting device, a semi-indirect light emitting device, a full-diffusion light emitting device, a semi-direct light emitting device, and a direct light emitting device based on light distribution.

With developments of technologies, the light emitting device is being used for various purposes. For example, the light emitting device may be used to direct a media facade that implements a media function by installing light emitting devices on an outer wall of a building. As another example, the light emitting device may be used as a portable cheering tool in a performance hall for a sports event or concert, which is an environment having illumination of a specific level or less. However, because a plurality of light emitting devices are individually controlled in such the performance environment, it is difficult to create a systematic lighting pattern or shape. In addition, it is difficult to achieve an effective cheering effect only by using a light source arranged in a light emitting device.

There may be the limitation of a usable wireless bandwidth (e.g., the data processing time of each light emitting device that occurs inevitably even when pieces of data are broadcast to a plurality of light emitting devices at the same time), as a cause of the problem difficult to be resolved.

Accordingly, to specifically solve the above-described problem, there is a need for a method capable of collectively controlling a plurality of light emitting devices and directing various performances in a performance hall such as a sports stadium or concert hall through this control.

SUMMARY

Embodiments of the inventive concept provide a method in which a receiving device effectively directs a direction object based on an object origin, and a lighting control system that effectively directs a direction object based on an object origin.

Problems to be solved by the inventive concept are not limited to the problems mentioned above, and other problems not mentioned will be clearly understood by those skilled in the art from the following description.

According to an embodiment, a lighting effect directing method of a receiving device includes determining coordinates of the receiving device at a seat based on seat information thus received, receiving and storing object data including a predefined direction shape and at least one expression level set to correspond to a size of the direction shape, and predefined color data, receiving a control packet including object information indicating the direction shape, an object origin of the direction shape, and the at least one expression level, and color information indicating a light emission color, determining a location relationship between the object origin and the determined coordinates of the receiving device, based on the object information, and performing a corresponding light emission operation such that the direction shape is expressed at the at least one expression level, based on the location relationship and the color information.

According to an embodiment of the inventive concept, in the lighting effect directing method of the receiving device, the determining of the location relationship includes determining the at least one expression level based on a distance between the object origin and the determined coordinates of the receiving device.

According to an embodiment of the inventive concept, in the lighting effect directing method of the receiving device, the object origin is center coordinates of the direction shape, and the determined coordinates of the receiving device is relatively determined based on the object origin.

According to an embodiment of the inventive concept, in the lighting effect directing method of the receiving device, the at least one expression level is differentially determined depending on a distance from the object origin.

According to an embodiment of the inventive concept, in the lighting effect directing method of the receiving device, the at least one expression level includes a first expression level determined within a predetermined distance from the object origin, and a second expression level determined outside the predetermined distance from the object origin.

According to an embodiment of the inventive concept, in the lighting effect directing method of the receiving device, the receiving device includes a plurality of receiving devices, and a first receiving device, which has the first expression level, from among the plurality of receiving devices emits light in the same color as a second receiving device having the second expression level.

According to an embodiment of the inventive concept, in the lighting effect directing method of the receiving device, the at least one expression level has a weight. The receiving device includes a plurality of receiving devices, which receive the control packet the same as one another, and processes the at least one expression level as a weight. A first receiving device, which has the first expression level, from among the plurality of receiving devices receives the color information the same as a second receiving device having the second expression level, and emits light in a different color by the weight.

According to an embodiment of the inventive concept, in the lighting effect directing method of the receiving device, the receiving device is provided with a first table in which a calculation value required for rotation conversion is mapped for each angle. The control packet further includes first indication information indicating rotation of the direction shape.

According to an embodiment of the inventive concept, in the lighting effect directing method of the receiving device, the receiving device is provided with a second table in which a calculation value required for the direction shape is mapped for each magnification. The control packet further includes second indication information indicating a size change of the direction shape.

According to an embodiment, a lighting effect directing method of a lighting control system including a server, a lighting control device, and a receiving device includes transmitting, by the server, seat information, determining, by the receiving device, coordinates of the receiving device at a seat based on seat information thus received, generating, by the lighting control device, object data including a predefined direction shape and at least one expression level set to correspond to a size of the direction shape, and color data, receiving and storing, by the receiving device, the object data and the color data from the lighting control device, generating, by the lighting control device, a control packet including object information indicating the direction shape, an object origin of the direction shape, and the at least one expression level, and color information indicating a light emission color, determining, by the receiving device, a location relationship between the object origin and the determined coordinates of the receiving device, based on the object information in the control packet received from the lighting control device, and performing, the receiving device, a corresponding light emission operation such that the direction shape is expressed at the at least one expression level, based on the location relationship and the color information.

According to an embodiment of the inventive concept, the embodiments may be a computer program stored in a computer readable recording medium to execute a lighting effect directing method.

Other details according to an embodiment of the inventive concept are included in the detailed description and drawings.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 4 is a diagram illustrating a lighting effect directing method based on an object origin, according to an embodiment of the inventive concept;

FIG. 6 is a structural diagram of a packet, according to an embodiment of the inventive concept;

FIG. 15 is a structural diagram of a packet, according to an embodiment of the inventive concept;

FIG. 16 is a first mapping table including resizing information, according to an embodiment of the inventive concept, and FIG. 17 is a second mapping table indicating rotation information, according to an embodiment of the inventive concept;

FIGS. 20 to 22 are diagrams illustrating a lighting effect directing method, according to an embodiment of the inventive concept.

DETAILED DESCRIPTION

Figure 1:
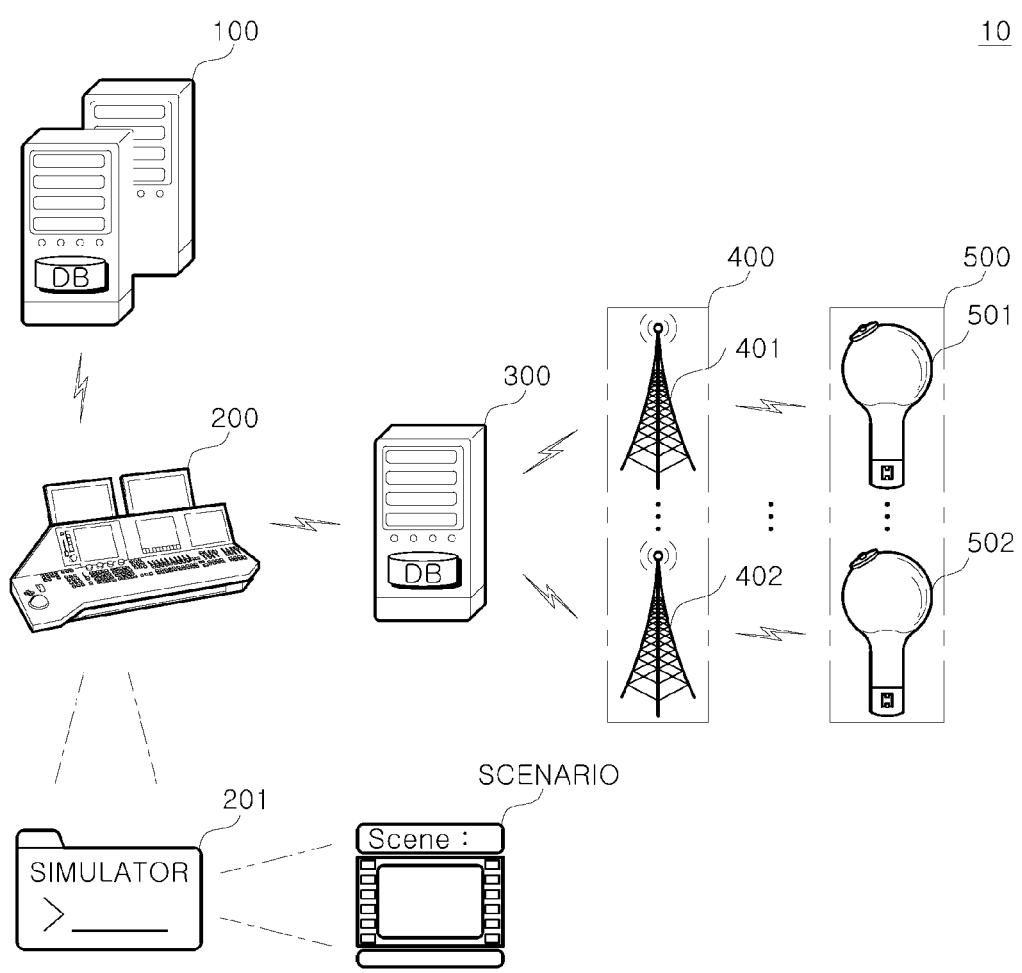
FIG. 1 is a conceptual diagram illustrating a lighting effect directing system, according to an embodiment of the inventive concept.

The above and other aspects, features and advantages of the inventive concept will become apparent from the following description of the following embodiments given in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the scope of the inventive concept to those skilled in the art. The inventive concept may be defined by the scope of the claims.

The terms used herein are provided to describe embodiments, not intended to limit the inventive concept. In the specification, the singular forms may include plural forms unless particularly mentioned. The terms "comprises" and/or "comprising" used herein do not exclude the presence or addition of one or more other components, in addition to the aforementioned components. The same reference numerals denote the same components throughout the specification. As used herein, the term "and/or" may include each of the associated components and all combinations of one or more of the associated components. It will be understood that, although the terms "first", "second", etc., may be used herein to describe various components, these components should not be limited by these terms. These terms are only used to distinguish one component from another component. Thus, a first component that is discussed below could be termed a second component without departing from the technical idea of the inventive concept.

A word "exemplary" is used herein in the sense of "being used as an example or illustration". An embodiment described herein as "exemplary" is not necessarily to be construed as preferred or advantageous over other embodiments.

Embodiments of the inventive concept may be described in terms of a function or a block performing a function. A block capable of being referred to as a 'unit' or a 'module' of the inventive concept is physically implemented by analog or digital circuits such as logic gates, integrated circuits, microprocessors, microcontrollers, memories, passive electronic components, active electronic components, optical components, hardwired circuits, and the like and may be selectively driven by firmware and software. The term "unit" used herein may refer to software or hardware such as field programmable gate array (FPGA) or application specific integrated circuit (ASIC), and the "unit" may perform some functions. However, the "unit" may be not limited to software or hardware. The "unit" may be configured to exist in an addressable storage medium or may be configured to play one or more processors. Therefore, as an example, "units" may include various elements such as software elements, object-oriented software elements, class elements, and task elements, processes, functions, attributes, procedures, subroutines, program code segments, drivers, firmware, microcodes, circuits, data, databases, data structures, tables, arrays, and variables. Functions provided in "units" and elements may be combined into a smaller number of "units" and elements or may be divided into additional "units" and elements.

Embodiments of the inventive concept may be implemented by using at least one software program running on at least one hardware device and may perform a network management function of controlling an element.

As illustrated in the figures, spatially relative terms, such as "below", "beneath", "lower", "above", "upper", and the like, may be used herein for ease of description to describe the relationship between one component and other components. It will be understood that the spatially relative terms are intended to encompass different orientations of the components in use or operation in addition to the orientation depicted in the figures. For example, when inverting a component shown in the figures, a component described as "below" or "beneath" of another component may be placed "above" another element. Thus, the exemplary term "below" may include both downward and upward directions. The components may also be oriented in different directions, and thus the spatially relative terms may be interpreted depending on orientation.

Unless otherwise defined, all terms (including technical and scientific terms) used herein have the same meaning as commonly understood by those skilled in the art to which the inventive concept pertains. The terms, such as those defined in commonly used dictionaries, should not be interpreted in an idealized or overly formal sense unless expressly so defined herein.

Hereinafter, an embodiment of the inventive concept will be described in detail with reference to the accompanying drawings.

FIG. 1 is a conceptual diagram illustrating a lighting effect directing system 10, according to an embodiment of the inventive concept.

Referring to FIG. 1, according to an embodiment of the inventive concept, a lighting effect directing system 10 in a performance hall may include a server 100, a light emitting control device 200, a master device 300, a transmitter 400, and a receiving device 500. The server 100 may include a database DB. The light emitting control device 200 may include a simulator 201 for expressing, conceiving, and designing a scenario. The lighting effect directing system 10 may direct various types of light emission patterns for performance direction such as cheering in audience seats in the performance hall by controlling a light emitting state of the receiving device 500 by using the light emitting control device 200.

The server 100 may store the database DB that stores various data necessary to direct a lighting effect. The database DB may provide various performance data to the light emitting control device 200 through wired communication, wireless communication, or a method of directly providing data. For example, the server 100 may provide performance data to the light emitting control device 200 through a wired network method such as a coaxial cable or a wired local area network (LAN) (e.g., Ethernet). For example, on a mobile communication network built according to a mobile communication standard communication method, the server 100 may provide performance data in a form of a packet to the light emitting control device 200. For example, the database DB stored in the server 100 may be physically installed into the light emitting control device 200 through a storage medium such as a removable disk.

The light emitting control device 200 may perform a function of controlling the receiving device 500 for the performance direction in the performance hall. For example, the light emitting control device 200 may be one of electronic devices such as a mobile phone, a smart phone, a laptop computer, a digital broadcasting terminal, a personal digital assistant (PDA), a portable multimedia player (PMP), a navigation system, a slate PC, a tablet PC, an ultrabook, and a wearable device, for example, a smart watch, a glass-type terminal (e.g., a smart glass), a head mounted display (HMD), or the like. The light emitting control device 200 may include all electronic devices capable of installing and executing an application related to an embodiment, may include some of configurations of the electronic device, or may be implemented in various forms capable of interworking therewith.

According to an embodiment of the inventive concept, the light emitting control device 200 may be one of software for PC and an electronic device such as MA Lighting grandMA2, grandMA3, ETC EOS, ETC ION, ETC GIO, Chroma Q Vista, High End HOG, High End Fullboar, Avolites Sapphire Avolites Tiger, Chamsys MagicQ, Obsidian control systems Onyx, Martin M6, Martin M1, Nicolaudie Sunlite, ESA, ESA2, Lumidesk, SunSuite, Arcolis, Daslight, LightRider, MADRIX, DJ LIGHT STUDIO, DISCO-DESIGNER VJ STUDIO, Stagecraft, Lightkey, or the like.

The light emitting control device 200 may include the simulator 201 for directing a lighting effect. The simulator 201 may be an electronic device that implements virtual simulation for implementing lighting effects, software that runs on the electronic device, or a complex device that combines the software and the electronic device. For example, a user may enter an electronic signal corresponding to a scene to be directed on the simulator 201. The simulator 201 may convert the entered electronic signal to conform to the protocol of the light emitting control device 200 and may provide the converted electronic signal to the light emitting control device 200 so as to be driven by the light emitting control device 200.

Various scenarios may be pre-determined and stored in the simulator 201 or entered from the user. The scenario may be a design drawing designed to induce a lighting effect by using the receiving device 500 throughout the performance time. A performance director may design the scenario and may enter the scenario into the simulator 201 so as to match the scenario. The scenario may be different for each scene of the performance or for each performance song of the performance, and thus may function as a design drawing for directing a cheering effect corresponding to each scene of the performance.

According to an embodiment of the inventive concept, the simulator 201 may generate a direction object based on the size of the performance hall and a direction shape, and may set an object origin of the direction object in advance.

According to an embodiment of the inventive concept, the simulator 201 may use a scene in an image storage format (e.g., BMP, JPG, GIF, TIFF, TIF, Exif, PNG, PPM, PGM, PBM, PNM, SVG, or the like) or a video storage format (e.g. mp4, avi, mov, wmv, mkv, flv, f4v, swf, VP8, VP9, webm, MPG, or the like), which is existing widely used for a direction object.

According to an embodiment of the inventive concept, the simulator 201 may specify one similar color in a scene to simplify the direction shape. The simulator 201 may define the border of the direction shape to separate the direction object from the background, and may make the background area transparent other than the direction shape or may specify a background color (e.g., black).

According to an embodiment of the inventive concept, the simulator 201 may separate an active area, which is a main representation area of the direction object, and a background area, which is a peripheral area.

According to an embodiment of the inventive concept, the simulator 201 may define the center coordinates of the direction object, and may define expression levels radially from the center coordinates. The expression level of the direction object may be set to maintain the direction shape, and expression levels, each of which sequentially has a high order may be set in proportion to a location relationship with the center coordinates.

In an embodiment, the light emitting control device 200 may include appropriate software or a computer program for controlling the receiving device 500. For example, the light emitting control device 200 may include DMX512, RDM, Art-Net, sACN, ETC-Net2, Pathport, Shownet, or KiNET as a protocol for controlling the receiving device 500. The light emitting control device 200 may transmit a data signal (e.g., an emission control signal) in an appropriate format such as DMX512 or Art-Net, sACN, ETC-Net2, Pathport, Shownet or KiNET. The light emitting control device 200 may generate an emission control signal for controlling the receiving device 500. The emission control signal may be broadcast to the receiving device 500, and thus one or more light emitting devices may emit light depending on the emission control signal. The emission control signal may include information about an emission state (e.g., an emission color, a brightness value, a blinking speed, or the like).

In an embodiment, the light emitting control device 200 may include a plurality of input/output ports. The light emitting control device 200 may have an input/output port corresponding to or related to a specific data signal format or protocol. For example, the light emitting control device 200 may have a first port dedicated to RDM and DMX512 data input/output and a second port dedicated to Art-Net and sACN, ETC-Net2, Pathport, Shownet, KiNET data input/output. The DMX512, RDM, Art-Net, sACN, ETC-Net2, Pathport, Shownet and KiNET protocols are widely known as control protocols for stage lighting installations. According to embodiments, the light emitting control device 200 may plan more flexible control for the receiving device 500 by using control protocols such as DMX512, RDM, Art-Net, sACN, ETC-Net2, Pathport, Shownet, and KiNET.

The master device 300 may be provided for efficient signal transmission in a performance hall. The master device 300 may include the database DB. The master device 300 may receive a control signal from the light emitting control device 200. The master device 300 may include information of the database DB stored in the master device 300 in the control signal and may provide the control signal to the transmitter 400 or directly provide the control signal to the receiving device 500. The master device 300 may be an electronic device such as a mobile phone, a smart phone, a laptop computer, a digital broadcasting terminal, a personal digital assistant (PDA), a portable multimedia player (PMP), a navigation system, a slate PC, a tablet PC, an ultrabook, and a wearable device, (e.g., a smart watch, a glass-type terminal (e.g., a smart glass), a head mounted display (HMD), or the like), but is not limited thereto. The master device 300 may not be necessarily provided as a separate hardware device, and may be combined and implemented as a part of the light emitting control device 200 or as a part of the transmitter 400.

The transmitter 400, which is a part of a communication device, may perform a function of amplifying or delivering an emission control signal received from the light emitting control device 200 or the master device 300. For example, the transmitter 400 may be implemented as a communication device such as an antenna. The transmitter 400 may transmit, to the receiving device 500, an emission control signal, which is received from the light emitting control device 200 and which is received from the master device 300. When the transmitter 400 receives the emission control signal for controlling emission of the receiving device 500 from the light emitting control device 200 and transmits the emission control signal to the receiving device 500, the receiving device 500 may emit light to correspond to an emission pattern included in the emission control signal.

In an embodiment, the transmitter 400 may be the common name for a plurality of transmitters. For example, the transmitter 400 may include a first transmitter 401, a second transmitter 402, and the like. For example, the plurality of transmitters may be provided in the performance hall. The first transmitter 401 for the first zone and the second transmitter 402 for the second zone are provided such that a wireless control signal is capable of being efficiently transmitted to each seat.

In an embodiment, it is disclosed that the transmitter 400 is a separate device from the light emitting control device 200. However, the light emitting control device 200 may include a communication module performing the same role as the transmitter 400. Accordingly, the light emitting control device 200 may perform the same role as the transmitter 400 according to embodiments. The receiving device 500 may receive the emission control signal from the light emitting control device 200 and then may emit light.

The transmitter 400 according to an embodiment of the inventive concept may have directivity. In a performance planning stage, the performance planner may arrange the transmitter 400 in consideration of the specification of a transmitter used in the corresponding performance. Accordingly, the receiving device 500 may receive an emission control signal from the transmitter 400 having identification information corresponding to identification information of a transmitter pre-stored in the receiving device 500.

Furthermore, the emission control signal generated from the light emitting control device 200 may be received by the master device 300. The master device 300 may convert the emission control signal into a wireless control signal. The master device 300 may deliver the converted wireless control signal to the transmitter 400. The transmitter 400 may broadcast the wireless control signal to the receiving device 500 in the performance hall by using wireless communication (e.g., RF communication, or the like). Here, the wireless control signal may be generated by converting control data into a form for controlling the receiving device 500 in a wireless communication method. The broadcasting may be understood as a concept in which a plurality of receiving devices receive a common signal and process an operation corresponding to the common signal.

Under the control of the light emitting control device 200, the receiving device 500 may perform a function of directing various types of light emission patterns in real time by the light emission control device 200 or depending on predetermined control information.

In an embodiment, the receiving device 500 may include a light emitting element such as a liquid crystal display (LCD) or light emitting diode (LED) or may be connected to the light emitting element. The receiving device 500 may be a device including any electronic device capable of wireless communication, and may be a small cheering tool carried by an audience in the performance hall such as an athletic stadium or a concert hall. For example, the receiving device 500 may correspond to a mobile phone, the wireless receiving device, a lighting stick, a lighting bar, a lighting ball, a lighting panel, and a device attached with a light source that is wirelessly controllable. In an embodiment, the receiving device 500 may be referred to as a lighting device, a receiver, a controlled device, a slave, or a slave lighting device. Also, the receiving device 500 may include a wearable device capable of being attached to and/or worn on a part of the body such as a wrist or chest.

In an embodiment, on the basis of identification information of the transmitter 400 thus previously stored, the receiving device 500 may interpret the emission control signal received from the transmitter 400 and may emit light. In detail, the receiving device 500 may compare the pre-stored identification information of the transmitter 400 with identification information of a transmitter included in the emission control signal. When the pre-stored identification information of the transmitter 200 is the same as identification information of a transmitter included in the emission control signal, the light emitting device 300 may emit light to correspond to an emission pattern included in the corresponding emission control signal.

In an embodiment, the receiving device 500 may be the common name for a plurality of light emitting devices. For example, the receiving device 500 may include a first light emitting device 501, a second light emitting device 502, and the like. For example, a plurality of light emitting devices may be located in the performance hall. The first light emitting device 501 located in the first zone may receive a control signal from the first transmitter 401, and the second light emitting device 502 located in the second zone may receive a control signal from the second transmitter 402. Accordingly, even though a plurality of receiving devices are located in the performance hall, distribution processing of the control signal may be possible.

The lighting effect directing method of the lighting effect directing system 10 according to an embodiment of the inventive concept may control a plurality of receiving devices based on an object origin. The lighting effect directing system 10 may control the numerous receiving device 500 simply based on the object origin without grouping the receiving devices 500. The receiving devices may quickly process control information without including group information inside the receiving devices. A method of controlling the receiving device 500 by using an object origin will be described with reference to the following drawings.

Figure 2:
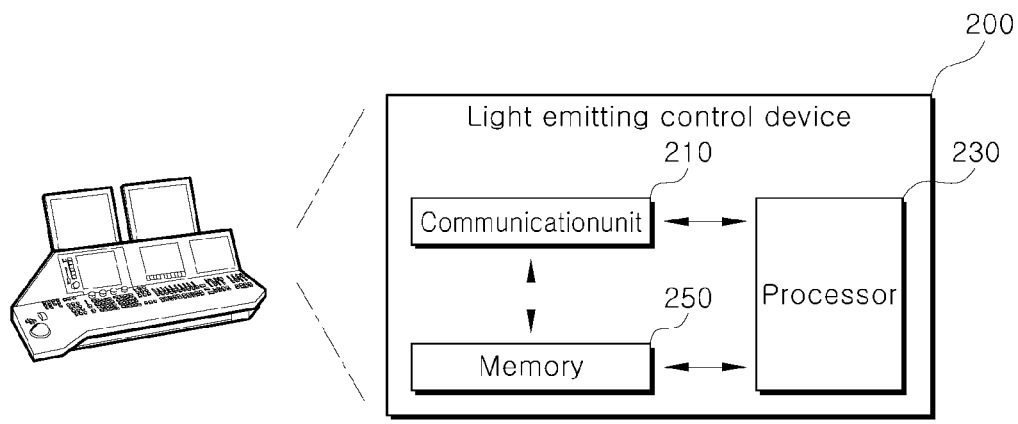
FIG. 2 is a block diagram illustrating a light emitting control device, according to an embodiment of the inventive concept.

FIG. 2 is a block diagram illustrating the light emitting control device 200, according to an embodiment of the inventive concept. A description the same as the description of FIG. 1 will be omitted to avoid redundancy.

The light emitting control device 200 may include a communication unit 210, a processor 230, and a memory 250.

The communication unit 210 may communicate with various types of external devices depending on various types of communication methods. The communication unit 210 may include at least one of a wireless-fidelity (WiFi) chip, a Bluetooth™ chip, a wireless communication chip, a near field communication (NFC) chip, and a radio frequency identification (RFID) chip.

According to the mobile communication technology of the inventive concept, the communication unit 210 may exchange a wireless signal with at least one of a base station, an external terminal, and an external server on a mobile communication network established depending on technical standards or communication methods (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), and the like).

Moreover, the wireless technologies according to an embodiment of the inventive concept includes, for example, wireless LAN (WLAN), Wireless-Fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and the like.

In addition, the communication technology according to an embodiment of the inventive concept may include a communication support technology by using at least one of Bluetooth™, radio frequency identification (RFID), infrared data association (IrDA), ultra wideband (UWB), ZigBee, near field communication (NFC), Wi-Fi, Wi-Fi Direct, wireless universal serial bus (wireless USB), transistor-transistor logic (TTL), USB, IEEE1394, Ethernet, musical instrument digital interface (MIDI), RS232, RS422, RS485, optical Communication, or coaxial cable communication.

The processor 230 may control overall operations of the light emitting control device 200 and, in more detail, may control operations of the remaining components implementing the light emitting control device 200. The processor 230 may be implemented with a general-purpose processor, a special-purpose processor, or an application processor. In an embodiment, the processor 230 may be implemented as an operation processor (e.g., a central processing unit (CPU), a graphic processing unit (GPU), an application processor (AP), and the like) including dedicated logic circuits (e.g., a field programmable gate array (FPGA), an application specific integrated circuits (ASICs), and the like), but is not limited thereto.

The memory 250 may be a local storage medium supporting various functions of the light emitting control device 200. The memory 250 may store a simulator 201 of FIG. 1 capable of being driven in the light emitting control device 200, an application program, pieces of data for operation of the light emitting control device 200, and commands. At least part of the application programs may be downloaded from an external device (e.g., the server 100) through wireless communication. The application program may be stored in the memory 250, may be installed in the light emitting control device 200, and may be driven by the processor 230 of the light emitting control device 200 to perform an operation (or function).

The memory 250 may be a dynamic random access memory (DRAM) such as a double data rate synchronous dynamic random access memory (DDR SDRAM), a low power double data rate (LPDDR) SDRAM, a graphics double data rate (GDDR) SDRAM, a rambus dynamic random access memory (RDRAM), DDR2 SDRAM, DDR3 SDRAM, or DDR4 SDRAM.

However, embodiments according to an embodiment of the inventive concept need not be limited thereto. In an embodiment, even when a power supply to the light emitting control device 200 is cut off, data needs to be stored. Accordingly, the memory 250 according to an embodiment of the inventive concept may be provided as a writable non-volatile memory to reflect changes. However, an embodiment is not limited thereto. For example, a flash memory, EPROM or EEPROM, resistive memory cells such as a resistive RAM (ReRAM), a phase change RAM (PRAM), a magnetic RAM (MRAM), a spin-transfer torque MRAM, a conductive bridging RAM (CBRAM), a ferroelectric RAM (FeRAM), and other various types of memory may be applied to the memory 250. Alternatively, the memory 250 may be implemented with various types of devices such as an embedded multimedia card (eMMC), universal flash storage (UFS), compact flash (CF), secure digital (SD), micro secure digital (Micro-SD), mini secure digital (Mini-SD), extreme digital (xD) or memory stick. For convenience of description in an embodiment of the inventive concept, it is described that all pieces of instruction information are stored in the single memory 250. However, an embodiment is not limited thereto. For example, the memory 250 may include a plurality of memories.

According to an embodiment of the inventive concept, the light emitting control device 200 may generate a control packet including object information indicating at least one expression level set to correspond to a predefined direction shape, an object origin of the direction shape, and a size of the direction shape, and color information indicating a light emission color. The control packet may be finally provided to the receiving device 500. Accordingly, the receiving device 500 may direct a specific lighting effect together with other receiving devices depending on a distance relationship with reference coordinates without separate settings for a group.

Figure 3:
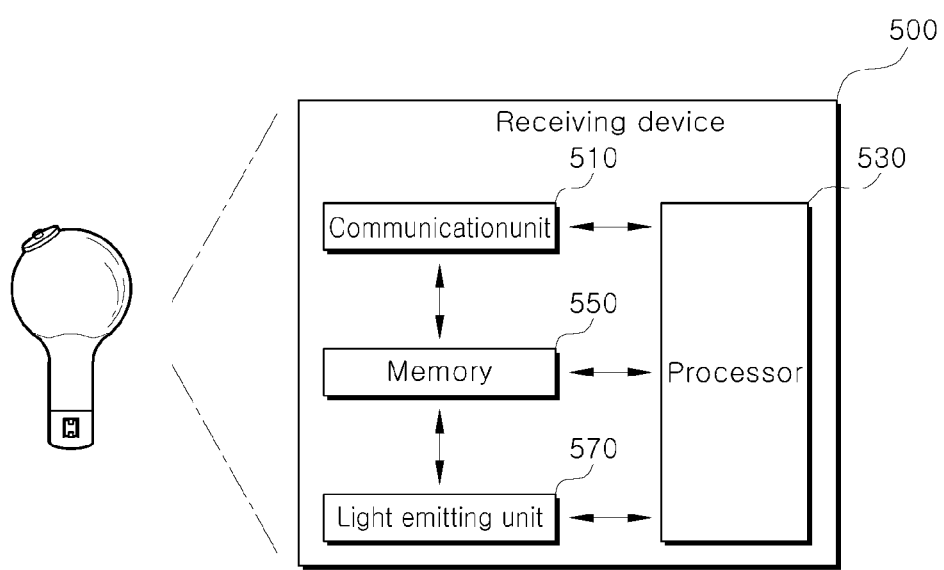
FIG. 3 is a block diagram illustrating a receiving device, according to an embodiment of the inventive concept.

FIG. 3 is a block diagram illustrating the receiving device 500, according to an embodiment of the inventive concept. A description the same as the description of FIGS. 1 and 2 will be omitted to avoid redundancy.

The receiving device 500 may include a communication unit 510, a processor 530, a memory 550, and a light emitting unit 570.

The communication unit 510 may communicate with various types of external devices depending on various types of communication methods. The communication unit 510 may include at least one of a wireless-fidelity (WiFi) chip, a Bluetooth™ chip, a wireless communication chip, a near field communication (NFC) chip, and a radio frequency identification (RFID) chip.

According to an embodiment, the communication unit 510 may support a common protocol to communicate with the communication unit 210 of FIG. 2. For example, the communication unit 510 may exchange a wireless signal with at least one of a base station, an external terminal, and an external server on a mobile communication network established according to GSM, CDMA, CDMA2000, EV-DO, WCDMA, HSDPA, HSUPA, LTE, LTE-A, or the like, or may communicate with the communication unit 210 by using at least one of WLAN, Wi-Fi, Wi-Fi Direct, DLNA, WiBro, WiMAX, Bluetooth™, RFID, Infrared Data Association (IrDA), ultra wideband (UWB), ZigBee, near field communication (NFC), wireless universal serial bus (Wireless USB), transistor-transistor logic (TTL), USB, IEEE1394, Ethernet, a musical instrument digital interface (MIDI), RS232, RS422, RS485, optical Communication, coaxial cable communication schemes.

The processor 530 may control overall operations of the receiving device 500 and, in more detail, may control operations of the remaining components implementing the receiving device 500. The processor 530 may be implemented with a general-purpose processor, a special-purpose processor, or an application processor. In an embodiment, the processor 530 may be implemented as an operation processor (e.g., a central processing unit (CPU), a graphic processing unit (GPU), an application processor (AP), and the like) including a digital signal processor (DSP) capable of converting an analog signal into a digital signal and performing high-speed processing, a micro controller unit (MCU), or a dedicated-logic circuit (e.g., a field programmable gate array (FPGA), an application specific integrated circuits (ASICs), and the like) supporting the necessary operations in the receiving device 500, but is not limited thereto.

According to an embodiment of the inventive concept, the processor 530 may actually perform calculations required by the receiving device 500. For example, the processor 530 may determine receiving device coordinates, which is coordinates of the receiving device 500, based on location information of the corresponding seat among seats in the performance hall, may calculate a location relationship between the receiving device coordinates and reference coordinates, may differently determine the expression level of the direction object based on whether the calculated location relationship exceeds a predetermined distance, may interpret a control packet received from the outside, or may perform an operation for rotating a direction object and an operation for resizing the direction object from information included in a control packet. The light emission of the receiving device 500, which is actually performed by the processor 530, will be described in more detail in embodiments in FIGS. 4 to 23.

The memory 550 may be a local storage medium supporting various functions of the light emitting control device 200. The memory 550 may store data and commands for the operation of the receiving device 500. At least part of the application programs may be downloaded from an external device (e.g., the server 100) through wireless communication. The application program may be stored in the memory 550, may be installed in the receiving device 500, and may be driven by the processor 530 of the receiving device 500 so as to perform an operation (or function).

Even when a power supply to the receiving device 500 is cut off, data needs to be stored. Accordingly, the memory 550 according to an embodiment of the inventive concept may be provided as a writable non-volatile memory to reflect changes. For example, the memory 550 may be implemented with a non-volatile memory such as a flash memory, a magnetic RAM (MRAM), a spin-transfer torque MRAM, a conductive bridging RAM (CBRAM), a ferroelectric RAM (FeRAM), a phase change RAM (PRAM), and a resistive RAM (ReRAM). However, embodiments of the inventive concept need not be limited thereto. For example, the memory 550 may be implemented with a dynamic random access memory (DRAM) such as a double data rate synchronous dynamic random access memory (DDR SDRAM), a low power double data rate (LPDDR) SDRAM, a graphics double data rate (GDDR) SDRAM, a rambus dynamic random access memory (RDRAM), DDR2 SDRAM, DDR3 SDRAM, or DDR4 SDRAM.

According to an embodiment of the inventive concept, the memory 550 may store seat information of a ticket held by an audience. The seat information of a ticket stored by the memory 550 may include at least one of seat information displayed on a ticket (e.g., seat 1 in row A), location information (e.g., GPS information of the corresponding seat) of the corresponding seat among seats in a performance hall, identification information (e.g., the top left seat among 50,000 seats is 'No.1' when performance direction data is generated) of the corresponding seat, or user information.

According to an embodiment of the inventive concept, the memory 550 may store seat information, which is entered from the outside and provided to the receiving device 500, and may determine the coordinates of the receiving device 500 by reading out the seat information stored in the memory 550. However, an embodiment is not limited thereto. For example, the memory 550 may store seat information obtained directly from the receiving device 500.

According to an embodiment of the inventive concept, the receiving device 500 may provide the seat information to the server 100. For example, the receiving device 500 may directly provide a signal including the seat information to the server 100 through the communication unit 510, may provide the signal to the server 100 through a user's smart device (not shown), or may provide the signal to the server 100 through the master device 300. The server 100 may centrally manage performance data by storing the seat information.

According to an embodiment of the inventive concept, data stored in the memory 550 may be entered into the receiving device 500 in a form of firmware in the production stage of the receiving device 500, or may be entered through an application installed in a terminal (e.g., a smartphone or a tablet PC) of an audience who possesses the receiving device 500 before or after the entrance to the performance hall.

In an embodiment, an audience being a user may electrically connect a light emitting device to a terminal possessed by the audience, and may download control-related information for performance direction from an external server through an application installed in the terminal to store the control-related information in the memory 550. The electrical connection may be made through short-range wireless communication or a physical connection between the terminal and the receiving device 500.

In an embodiment, the data stored by the memory 550 may be entered during a ticket check process before admission. In detail, the audience may perform a performance ticket checking step before entering the performance hall. In this case, a performance staff may directly enter seat information included in a ticket into the receiving device 500 by hand or may receive the seat information included in the ticket by using an OCR function or a 2D electronic code reader function expressed as a barcode or a QR code through an information check device (not shown). The performance staff may provide the receiving device 500 with control-related information associated with location information corresponding to the seat information and may store the control-related information in the memory 550.

In an embodiment, the performance data may be location information for each seat in the performance hall. Moreover, the information check device may provide the receiving device 500 with the control-related information associated with location information through real-time communication with an external server (e.g., 100 in FIG. 1) in the performance hall or may store the control-related information associated with location information in advance at a step of planning a performance and may provide the control-related information to the receiving device 500 in the performance hall.

In an embodiment, the information check device may include an electronic device such as a kiosk (not shown). In this case, the audience may directly perform the performance ticket checking step through the kiosk. The kiosk may receive electronic code information (in other words, information read through a barcode, a QR code, a RFID, a NFC, or the like) included in the ticket, may provide the receiving device 500 with the control-related information associated with location information corresponding to the electronic code information, and may store the control-related information in the memory 550. In this case, the kiosk may store the control-related information associated with location information in advance, through communication with an external server (e.g., 100 in FIG. 1) or at a step of planning a performance.

According to an embodiment of the inventive concept, the memory 550 may store direction object data and color data in advance. As described above, the direction object data may be stored at the production stage of the receiving device 500 or may be stored in advance before a performance (e.g., being stored before or after the entrance to the performance hall before the start of the performance), thereby smoothly directing lighting effects during the performance.

According to an embodiment of the inventive concept, the direction object data and the color data may be included in a control signal broadcast in a performance hall and may be provided to the receiving device 500. According to an embodiment, the direction object data and the color data may be provided to the receiving device 500 as a performance preparation signal separately from a control signal.

According to an embodiment of the inventive concept, the direction object data may include the type of a direction shape, an expression level set differently for each type of the direction shape, rotation mapping data calculated for each predetermined angle for the rotation of the direction shape, or resizing mapping data calculated in advance to resize the direction shape. In an embodiment, the direction object data may function as basic information for determining an operation, such as an operation as to whether the receiving device 500 emits light, an operation as to whether the receiving device 500 display a color, an operation as to whether the receiving device 500 vibrates, or an operation as to whether the receiving device 500 generates sound. The direction object data will be described in more detail in embodiments in FIGS. 4 to 23.

According to an embodiment of the inventive concept, a resizing mapping table may be a table for adjusting the magnification of a direction object depending on a predetermined size based on a data expression range. A rotation mapping table may be a lookup table in which rotation conversion values capable of being calculated in a method of linear algebra to rotate a direction object are calculated in advance for each predetermined angle. The resizing mapping table and the rotation mapping table will be described in more detail with reference to FIGS. 16 and 17.

According to an embodiment of the inventive concept, the color data may include RGB values provided to emit light in a predetermined color depending on a data expression range. To express all colors, RGB values having three color channels need to be indicated with 3 bytes. However, in a scene to be presented in a performance hall, it may not be necessary to substantially express all natural colors, and it may be necessary to reduce the amount of data transmission and throughput. Accordingly, the color data may include a mapping table for some colors to be displayed by the receiving device 500 depending on scenarios.

The light emitting unit 570 may include one or more light source elements. The light source element may be, for example, a light emitting diode (LED), or the like. Also, the light emitting unit 570 may output light of various colors according to RGB color information by using a light source element.

According to an embodiment of the inventive concept, the receiving device 500 may receive direction object data including a predefined direction shape and at least one expression level set to correspond to a size of the direction shape, and the predefined color data before the performance, and may store the direction object data and the color data in the memory 550. The receiving device 500 may receive a control packet including object information indicating the direction shape, reference coordinates of the direction shape, and the at least one expression level, and color information indicating a light emission color, from the light emitting control device 200 or from the transmitter 400. The processor 530 may provide a result of decoding the control packet to the light emitting unit 570. The light emitting unit 570 may emit light based on the control packet. This will be described in detail with reference to FIG. 4.

FIG. 4 is a diagram illustrating a lighting effect directing method based on an object origin, according to an embodiment of the inventive concept.

According to an embodiment, audience seats may be interpreted as the space of x-axis and y-axis coordinates. For example, the total of 400 audience seats (i.e., 400 audience seats having 20 audience seats arranged in a row and 20 audience seats arranged in a column) may be set as a unit object for directing a first scene SCENE1. However, the technical spirit of the inventive concept is not limited to the disclosed numbers and may be transformed into unit objects having various horizontal and vertical values. Hereinafter, for convenience of description, a unit object of 20×20 (width×height) will be illustrated.

A direction object may have an external shape indicated by the object. The visual shape of a direction object may be referred to as a "direction shape".

According to an embodiment of the inventive concept, the direction object may include an object origin, and a location of an object origin in the coordinate space may be referred to as "reference coordinates". For example, the center coordinates of the direction shape may be set to an object origin (an absolute coordinate method). However, an embodiment is not limited thereto. For example, locations of various direction shapes may be set and changed to the object origin. The object origin may be predefined, and the light emitting control device 200 and the receiving device 500 may share the same object origin defined for each direction shape.

According to the absolute coordinate method as an embodiment of the inventive concept, in the case of transmitting reference coordinates, which are coordinate information of the object origin of an object, through a control packet, the reference coordinates may be an absolute object origin.

For example, it may be assumed that the reference coordinates of a first object are (10, 10), the reference coordinates of a second object are (30, 10), the reference coordinates of a third object are (50, 10), and the reference coordinates of the fourth object are (260, 10).

To transmit a value including 260 among the values without problems, it is impossible to use 1 byte (8 bits) with the expression range of 0 to 255, but it is possible to use 2 bytes (16 bits) with 0 to 65535, for example. That is, there is a case where the space of coordinate data having 2 bytes is allocated to a packet, but there is no problem when a packet size is sufficient. According to an embodiment of the inventive concept, an object origin may be determined in advance depending on a direction shape or may be set and stored under the control of the light emitting control device 200 (a relative coordinate method). The object origin may be changed under the control of the light emitting control device 200. When an object origin is changed, the receiving device 500 may maintain the synchronization with the light emitting control device 200 by updating the coordinate information depending on the changed standard.

As an embodiment of the inventive concept, a relative coordinate method is described below. The relative coordinate method may be a coordinate value set by assuming a previously applied coordinate value as a standard. As compared to a case where an allocation size of reference coordinates is 2 bytes based on the absolute coordinate method, when the relative coordinate method, which sets coordinates of the object origin to an origin of (0,0) on the x-y coordinate plane, is used, an object may be expressed sufficiently without exceeding the value of 255, which is the level of a 1-byte data expression range.

For example, it may be assumed that the reference coordinates (10,10) of the first object are (0,0) that is an origin of a seat on x-y coordinates. The reference coordinates (20,0) of the second object are coordinates set by using the previously set reference coordinates (10,10) of the first object as the coordinate origin (0,0).

The conversion of the reference coordinates of the second object into absolute coordinates is as follows in Equation 1.

(Absolute reference coordinates of second object)=(relative reference coordinates of second object)+(relative reference coordinates of first object) [Equation 1]

According to Equation 1, because the relative reference coordinates of the first object are (10, 10) and the relative reference coordinates of the second object are (20, 0), it may be determined that the absolute reference coordinates of the second object are (30, 10).The relative reference coordinates (20,0) of a third object are coordinates set by using the previously applied relative reference coordinates (20,0) of the second object as the coordinate origin, which is the origin of (0,0) on the x-y coordinate plane. Likewise, the conversion of the reference coordinates of the third object into absolute coordinates is as follows in Equation 2.

(Absolute reference coordinates of third object)=(relative reference coordinates of third object)+(relative reference coordinates of second object)+(relative reference coordinates of first object) [Equation 2]

The relative reference coordinates of the second object is obtained by using the relative reference coordinates of the first object as the origin. Assuming that a coordinate origin (0,0) of the first object mapped to a seat is set to the basis, it may be seen that the conversion to the above-mentioned absolute coordinates is "(10,10)+(20,0)+(20,0)=(50,10)".

When the above-mentioned equation is normalized, an equation for calculating absolute reference coordinates of an n-th object ('n' is a natural number) is as follows in Equation 3.

$$RC_{abs}(n) = \sum_{k=1}^{n} RC_{rel}(k) \quad \text{[Equation 3]}$$

($RC_{abs}$: absolute reference coordinates, $RC_{rel}$: relative reference coordinates)

According to an embodiment of the inventive concept, when the coordinates of receiving devices are expressed continuously (repetition) or arranged at regular intervals, X and Y distance values for the corresponding interval may be used. For example, without the need to transmit coordinate values to be expressed for each direction object, it is enough to transmit only one packet including coordinates corresponding to a direction shape for expressing the first object, and expression intervals. Accordingly, coordinate value data required for each object may be reduced, and communication occupancy and communication time may also be reduced.

According to an embodiment of the inventive concept, in the case where coordinates of receiving devices are continuously expressed in a grid pattern such as a checkerboard, when only the first single object reference coordinates are delivered because sizes of unit objects are the same as one another, the rest of the objects may be determined to be displayed adjacently in a checkerboard pattern (grid shape). In this case, it is sufficient to deliver only one reference coordinates of the representative object.

TABLE 1

| Direction objecting control packet | Data size | 1-st | 2-nd | 3-rd | 4-th | 5-th | 6-th | 7-th | 8-th | 9-th | 10-th | 11-th | 12-th | 13-th | 14-th | 15-th |
|---|---|---|---|---|---|---|---|---|---|---|---|---|---|---|---|---|
| Absolute coordinate method | 60 Byte | (10, 10) | (30, 10) | (50, 10) | (70, 10) | (90, 10) | (110, 10) | (130, 10) | (150, 10) | (170, 10) | (190, 10) | (210, 10) | (230, 10) | (250, 10) | (270, 10) | (290, 10) |
| Relative coordinate method | 30 Byte | (10, 10) | (20, 0) | (20, 0) | (20, 0) | (20, 0) | (20, 0) | (20, 0) | (20, 0) | (20, 0) | (20, 0) | (20, 0) | (20, 0) | (20, 0) | (20, 0) | (20, 0) |
| Interval displaying method | 4 Byte | (10, 10) | | | | | | | (20, 0) | | | | | | | |

In an embodiment of the inventive concept, a direction object may represent a picture, a video, a character string, or font data, but is not limited thereto. The data representing the direction object may have a file type, an array type, or a bit stream that is a continuation of data in unit of packet, but is not limited thereto. In an embodiment of the inventive concept, for convenience of description, a packet is described as a medium that delivers information of a direction object. It is assumed that the packet delivers information in a form of a bit stream. According to an embodiment of the inventive concept, the direction object data stored by the memory 550 of the receiving device 500 may include information about a direction object. The direction object data may further include direction object attribute information indicating characteristics of the direction object, settings, and summary of specifications. In an embodiment, the direction object attribute information may be positioned in a header of direction object data.

The direction object data may be compressed. For example, the processor 530 may reduce the amount of data by applying a compression algorithm to data bits overlapping the direction object data. For example, the processor 530 may reduce the amount of data by using a correlation between pieces of adjacent data of the direction object data.

According to an embodiment of the inventive concept, the first scene SCENE1 may include a valid area in which a direction shape is displayed and a background area in which a direction shape is not displayed. The valid area may include a direction object. Receiving devices included in the valid area may emit light in a specific color indicated by the light emitting control device 200. The receiving device included in the background area may be set to maintain the existing light emitting state, to emit light with predetermined color information (e.g., Black) or to stop a light emitting operation.

According to an embodiment, a control packet transmitted (broadcast) from the light emitting control device 200 may be provided differently for each audience seat zone of the performance hall. Referring to FIG. 4, number 1, number 2, number 3, number 4, and number 5 may be displayed as expression levels, and the control packet may be provided to a receiving device located in a valid area indicating a direction shape. The control packet may not be provided to a receiving device located in an invalid area where a number is not displayed.

According to an embodiment of the inventive concept, all receiving devices may receive the same control packet. Each of the receiving devices may decode the control packet, and may identify a direction shape, an expression level, reference coordinates, and light emission color included in the control packet. Each of the receiving devices may determine a location relationship between the reference coordinates and the coordinates of the receiving device itself, and may determine its own expression level based on whether the location relationship is within a preset distance. When the own expression level is lower than the indicated expression level, each of the receiving devices corresponds to a valid area and thus may emit light depending on predetermined color information. When the own expression level exceeds the indicated expression level, each of the receiving devices may not emit light corresponding to the background area or may emit light with a value determined to correspond to the background color.

According to an embodiment of the inventive concept, all the receiving devices may receive the same control packet, and each of the receiving devices may set its own expression level to weight, and may perform weighted light emission with color information received from the control packet. For example, when all the receiving devices receive a control packet in which color information corresponds to red, a receiving device in which an expression level is "2" may emit light in a color darker or lighter than red as compared to a receiving device having an expression level of "1". Similarly, the receiving device having the expression level of "3" may use the light emission intensity or light emission color as a weight compared to the receiving device having the expression level of "2". Accordingly, the receiving devices may express a dynamic direction object with a small amount of data.

According to an embodiment of the inventive concept, the direction shape of the first scene SCENE is set to a heart shape; the expression level of the first scene SCENE1 is set to "5"; and, the center coordinates of the direction object are set as reference coordinates. The expression level may be differentially determined depending on a seat distance (or is capable of being interpreted as a pixel distance) from the reference coordinates. As the seat distance increases, the expression level may increase.

For example, when the center coordinates of the heart-shaped direction shape are reference coordinates, the expression level of reference coordinates is "0", and the expression level of the predetermined seat location (or is capable of being interpreted as a pixel), which is directly adjacent to the reference coordinates and maintains a heart shape, is "1". in a similar way, the expression level of a seat location, which is immediately adjacent to the seat location of expression level "1" and which is determined in advance to maintain a heart shape, is "2"; the expression level of a seat location, which is immediately adjacent to the seat location of expression level "2" and which is determined in advance to maintain a heart shape, is "3"; and, the expression level of a seat location, which is immediately adjacent to the seat location of expression level "3" and which is determined in advance to maintain a heart shape, is "4".

In a case of a direction shape indicating a heart shape, expression levels "0" to "4" may indicate a heart shape, but expression level "5" may indicate a shape that induces a decoration effect by emitting light at a seat location located in a specific location relationship with reference coordinates. In this case, because the expression levels "0" to "4" correspond to a shape related to a heart shape, the expression levels "0" to "4" may be referred to as a "lighting object". Because the expression level "5" decorates the lighting object, the expression level "5" may be referred to as an 'effecting object'. As such, the direction object may separate a lighting object and an effecting object depending on the expression level, and shapes of the lighting object and the effecting object may be designed in advance depending on the direction shape.

According to an embodiment of the inventive concept, the lighting effect directing method of a direction object based on reference coordinates does not determine, in advance, whether a receiving device located at a specific seat will emit light. The receiving devices may receive and decode a control packet for determining whether to emit light, may identify reference coordinates and object information, may determine a location relationship between own coordinates of the receiving devices and the reference coordinates, and may determine whether light is emitted, by comparison to the expression level of the direction object.

According to an embodiment of the inventive concept, the lighting effect directing method of a direction object based on reference coordinates may group specific receiving devices separately or may display a direction object with various direction shapes to audience seats without the need to store group information, thereby implementing dramatic and dynamic performance directions. Moreover, because direction shapes such as complex shapes and complex outlines are capable of being displayed with a small amount of data processing, performance hall may be controlled effectively by reducing the display latency of the direction object caused by the processing time of the receiving device 500.

Figure 5:
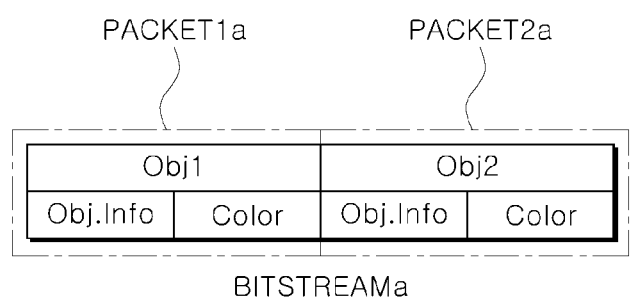
FIG. 5 is a structural diagram of a bitstream, according to an embodiment of the inventive concept.

FIG. 5 is a structural diagram of a bitstream BITSTREAMa, according to an embodiment of the inventive concept. FIG. 6 is a structural diagram of a control packet PACKET1a, according to an embodiment of the inventive concept.

In an embodiment of the inventive concept, it is illustrated that a data expression unit has 1 byte, but this is only for convenience of description and is not limited thereto. Hereinafter, a data expression range will be described by using a data expression unit of 1 byte.

FIG. 5 is a structural diagram of a bitstream BITSTREAMa, according to an embodiment of the inventive concept. Referring to FIG. 6, it may be understood that the first bitstream BITSTREAMa includes a first control packet PACKET1a and a second control packet PACKET2a, and further includes at least one control packet thus sequentially received.

The first control packet PACKET1a may relate to a first direction object Obj1. In an embodiment, the first control packet PACKET1a may include an object information Obj.Info and a color information Color. Similarly, the second control packet PACKET2a may relate to a second direction object Obj2 and may include the object information Obj.Info and the color information Color.

In an embodiment of the inventive concept, the object information Obj.Info may be information about a direction object, and may include a direction shape, reference coordinates of the direction shape, and at least one expression level for the direction object. The object information Obj.Info may be generated in the light emitting control device 200 in FIG. 1. Some of the object data previously stored in the receiving device 500 in FIG. 1 may be indicated. The receiving device 500 may load data corresponding to an instruction of the object information Obj.Info from pre-stored object data based on the object information Obj.Info, and may perform a specific light emitting operation.

For example, a direction object may have 256 direction shapes capable of being expressed in one byte. For example, because the reference coordinates are usually set to the center coordinates of the direction object, the reference coordinates may be determined as a number not exceeding 16. Because the x-coordinate and the y-coordinate may be expressed with only 8 bits, the reference coordinates may be represented in only one byte. In another example, the reference coordinates represent x-coordinate values between 1 and 20 and y-coordinate values between 1 and 20, and thus may be expressed in two bytes. For example, an expression level may have 256 levels capable of being expressed with one byte.

FIG. 6 is a structural diagram of a control packet PACKET1a, according to an embodiment of the inventive concept. Referring to FIG. 6, as the object information Obj.Info, an object shape may be expressed by being mapped to an object number. For example, the heart-shaped object shape may be mapped to object number "1". The decimal number "1" is a hexadecimal number "0x01". The object information may be expressed in one byte.

According to an embodiment of the inventive concept, even when a direction object input to the receiving device 500 has information called the same name for each zone to effectively express a directing object, shapes or sizes of the information may be different from one another. For example, In a unit object with a size of 20×20, a heart-shaped direction object having a size of 20×20 may be an object having number 1 (i.e., object number "1"). In a unit object with a size of 10×10, a heart-shaped direction object having a size of 10×10 may be an object having number 1 (i.e., object number "1").

As the object information Obj.Info, the reference coordinates may be expressed as an x coordinate value and a y coordinate value. For example, the reference coordinates of a unit object expressed as a 20×20 array may be (10, 10). The decimal number "10" may be a hexadecimal number "0×0A". The reference coordinates expressed as two hexadecimal digits (i.e., x coordinate and y coordinate) may be expressed in two bytes.

As the object information Obj.Info, an expression level may indicate a direction object size or an expression subdivision. For example, when the expression level is 5, the decimal number "5" may be represented as the hexadecimal number 0×05, and the information may be delivered by using one byte.

The color information Color may indicate the light emission color of the receiving device according to the expression level. Because RGB data has 3 channels (R, G, B), three bytes may be required. However, a light emitting device may direct a scene in a performance hall with 256 colors represented in one byte by storing specific RGB values required for light emission in advance.

In an embodiment of the inventive concept, the expression levels "0" to "4" may mean that light is emitted in a first color (e.g., red) (lighting object). The expression level "5" may mean that light is emitted in a second color (e.g., black) (effecting object).

As a method for emitting light with an expression level having the same color, the valid area of the scene may be limited to the logical value (Bool) "1", and the logical value of the background area may be limited to "0". According to an embodiment, the valid area and the background area may be mutually inverted through a logical inversion operation. Besides, the valid area and the background area may be inverted by changing the standard operation expression transmitted by using the control packet or through a logic inversion operation (NOT operation).

In an embodiment of the inventive concept, each of the receiving devices may emit light differently for each expression level. Referring to FIG. 6, a receiving device corresponding to expression level "1" may emit light with a pre-stored RGB value (e.g., #FFFF00) corresponding to yellow. The receiving device corresponding to expression level "2" may emit light with a pre-stored RGB value (e.g., #FFA500) corresponding to orange. Likewise, the receiving device corresponding to expression level "3" may emit light with a pre-stored RGB value (e.g., #FF0000) corresponding to red. The receiving device corresponding to expression level "4" may emit light with a pre-stored RGB value (e.g., #722f37) corresponding to a wine color. The receiving device corresponding to expression level "5" may emit light with a pre-stored RGB value (e.g., #000000) corresponding to black.

Although not explicitly shown in FIG. 6, according to an embodiment of the inventive concept, the same color may be referenced for each different expression level. As weight based on an expression level is allocated, and thus different colors may be expressed for each expression level. In this case, the color information Color may indicate only one color.

Figure 7:
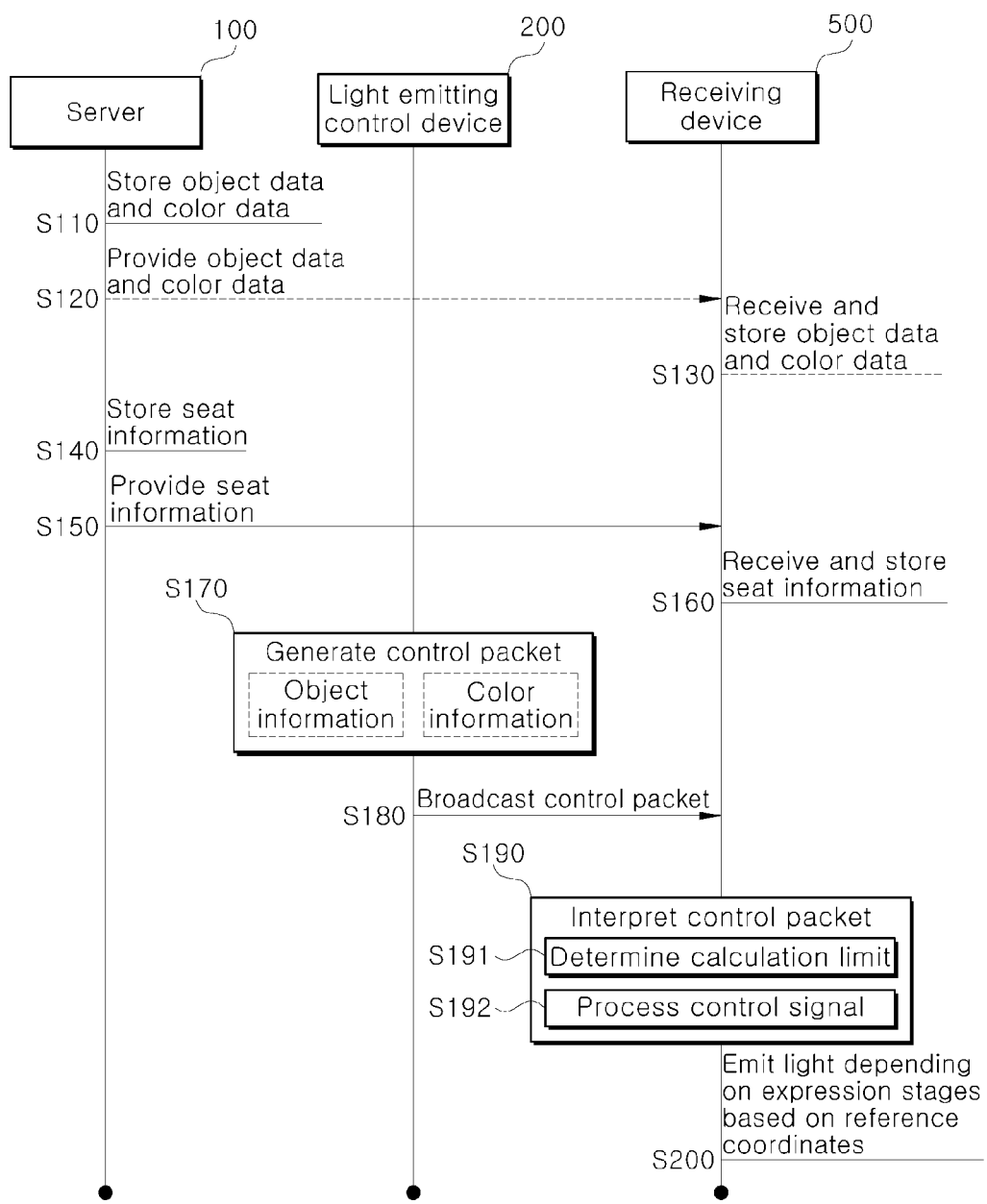
FIG. 7 is a flowchart of a lighting effect directing method, according to an embodiment of the inventive concept.

FIG. 7 is a flowchart of a lighting effect directing method, according to an embodiment of the inventive concept.

Details described in FIGS. 1 to 6 will be omitted within a range in which the details do not conflict with FIG. 7.

In step S110, the server 100 may store object data (in the inventive concept, it also referred to as "direction object data") and color data. The direction object data may include the type of a direction shape, an expression level set differently for each type of the direction shape, rotation mapping data calculated for each predetermined angle for the rotation of the direction shape, or resizing mapping data calculated in advance to resize the direction shape. The color data may include RGB values provided to emit light in a predetermined color depending on a data expression range.

In step S120, object data and color data stored in the server 100 may be provided to the receiving device 500. The object data and the color data may be transmitted before the start of the performance.

In step S130, the receiving device 500 may receive the object data and the color data and may store the object data and the color data in the memory 550 in FIG. 1. The steps shown in FIG. 7 need not necessarily be interpreted in time series. For example, the object data and the color data may be stored in the production stage of the receiving device 500, may be stored before or after entering the performance hall and before the start of the performance, may be received immediately before the direction of the object, or may be received during an idle time during a performance. In other words, it is enough to secure the object data and the color data in advance only before the performance or at a point in time when the direction is necessary.

In step S140, the server 100 may store seat information. The seat information may include at least one of location information of a seat indicated on a ticket, identification information of the corresponding seat, and user information. The seat information may be obtained during a ticket checking stage before admission, may be obtained in a process in which a user located at an audience seat enters the seat information into an application installed on a user terminal, or may be obtained by using short-range communication when a specific receiving device is within a specific distance from a router or beacon that is the type of a short-range communication device, but is not limited thereto.

In step S150, the server 100 may provide the seat information to the receiving device 500. In step S160, the receiving device 500 may receive the seat information and may store the seat information in the memory 550.

In the inventive concept, step S140 and step S110 do not mean that step S140 and step S110 are temporally precedent to each other. For example, it may be understood that step S110 to step S130 may be performed after step S140 to step S160.

In step S170, the light emitting control device 200 may generate a control packet including object information Obj.Info and color information Color. In step S180, the control packet may be broadcast to the receiving device 500.

In step S190, the receiving device 500 may interpret the control packet. According to an embodiment, in step S191, the receiving device 500 may determine a calculation limit. For example, when a distance from the reference coordinates is greater than a predetermined limit distance, the receiving device 500 may reduce the amount of computation without determining a location relationship between the reference coordinates and the coordinates of the receiving device 500 itself. According to an embodiment, in step S192, the receiving device 500 may process a control signal. The control signal may be included in the control packet and may be various signals for controlling the receiving device 500. For example, the control signal may indicate attribute information of the receiving device 500 or may include instructions for specifically controlling the receiving device 500 such as light emission, vibration, and sound generation.

In step S200, the receiving device 500 may emit light depending on expression stages based on reference coordinates. Because step S200 is described in FIG. 4, redundant description is omitted.

Figure 8:
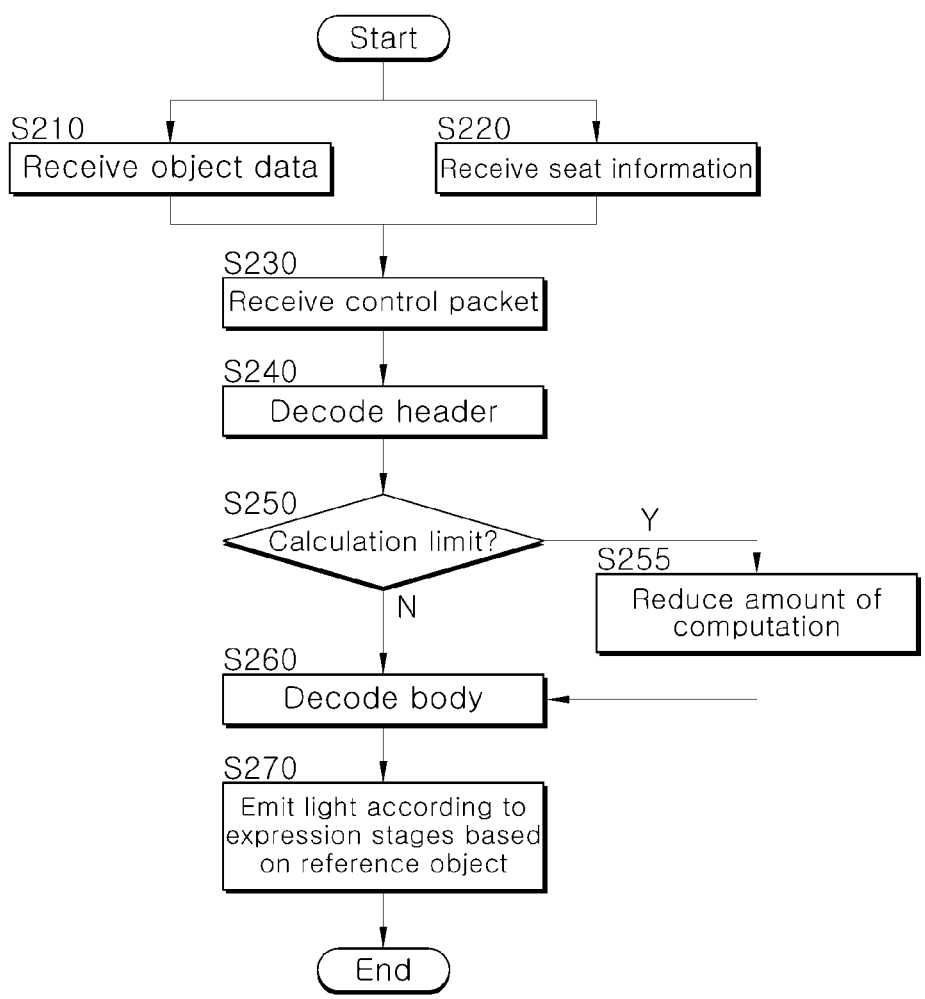
FIG. 8 is a flowchart of a lighting effect directing method, according to an embodiment of the inventive concept.

FIG. 8 is a flowchart of a lighting effect directing method of the receiving device 500 in FIG. 1, according to an embodiment of the inventive concept.

In step S210, the receiving device 500 may receive object data. The receiving device 500 may further receive color data together with the object data. The object data is similar to that described in FIGS. 1 and 7, and thus redundant descriptions will be omitted.

In step S220, the receiving device 500 may receive seat information. The seat information is similar to that described in FIGS. 1 and 7, and thus redundant description will be omitted.

Step S210 and step S220 may not have a temporal precedence relationship.

In step S230, the receiving device 500 may receive a control packet. In an embodiment, the control packet may include object information. In an embodiment, the control packet may include object information and color information.

In step S240, the receiving device 500 may decode the header of the control packet. For example, a header of the control packet may include meta data about a direction object, such as an object number, an object shape, or an object origin.

In step S250, the receiving device 500 may determine whether to have a calculation limit. According to an embodiment, the receiving device 500 may determine the calculation limit based on the direction shape or the object origin, and may perform calculations while omitting unnecessary parts of the calculations, thereby improving the calculation speed.

According to an embodiment of the inventive concept, when it is determined based on the direction shape and the object origin that coordinates (i.e., device coordinates) of the receiving device 500 are farther than the predetermined limit distance, the receiving device 500 may omit the determination of the location relationship between the object origin and device coordinates and may reduce the amount of computation (step S255).

When the receiving device 500 receives only object data, the predetermined light emission color of the receiving device 500 may be fixed. Nevertheless, because the receiving devices 500 may perform weighted light emission according to the expression level, the color data may not be received. Alternatively, despite the absence of color information, a direction object may be directed dynamically.

In step S260, the receiving device 500 may decode the body of the control packet. The body of the control packet may be a substantial area of data excluding the header, and may mean the substance of data, not meta data. For example, the body of the control packet may include color information. The receiving device 500 may identify color information for emitting light. In step S270, the receiving device 500 may emit light according to expression stages based on an object origin. In an embodiment, the receiving device 500 may determine the expression level depending on a relationship with a location from reference coordinates by decoding the body, may interpret color information corresponding to the direction shape and expression level, and may emit light in a corresponding color.

FIGS. 9 to 13 are diagrams illustrating a lighting effect directing method according to an expression stage, according to an embodiment of the inventive concept. Referring to FIGS. 9 to 13, similarly to that described in FIG. 4, a main representation object of the direction object may be referred to as a "lighting object LO". An auxiliary object that decorates a lighting object may be referred to as an "effecting object EO". Moreover, as an element constituting a scene, a valid area, in which a direction shape is displayed, and a background area EA, in which a direction shape is not displayed, may be distinguished from each other. The reference object RO may be set to a location (i.e., the center coordinates of a direction object) of (10, 10).

Figure 9:
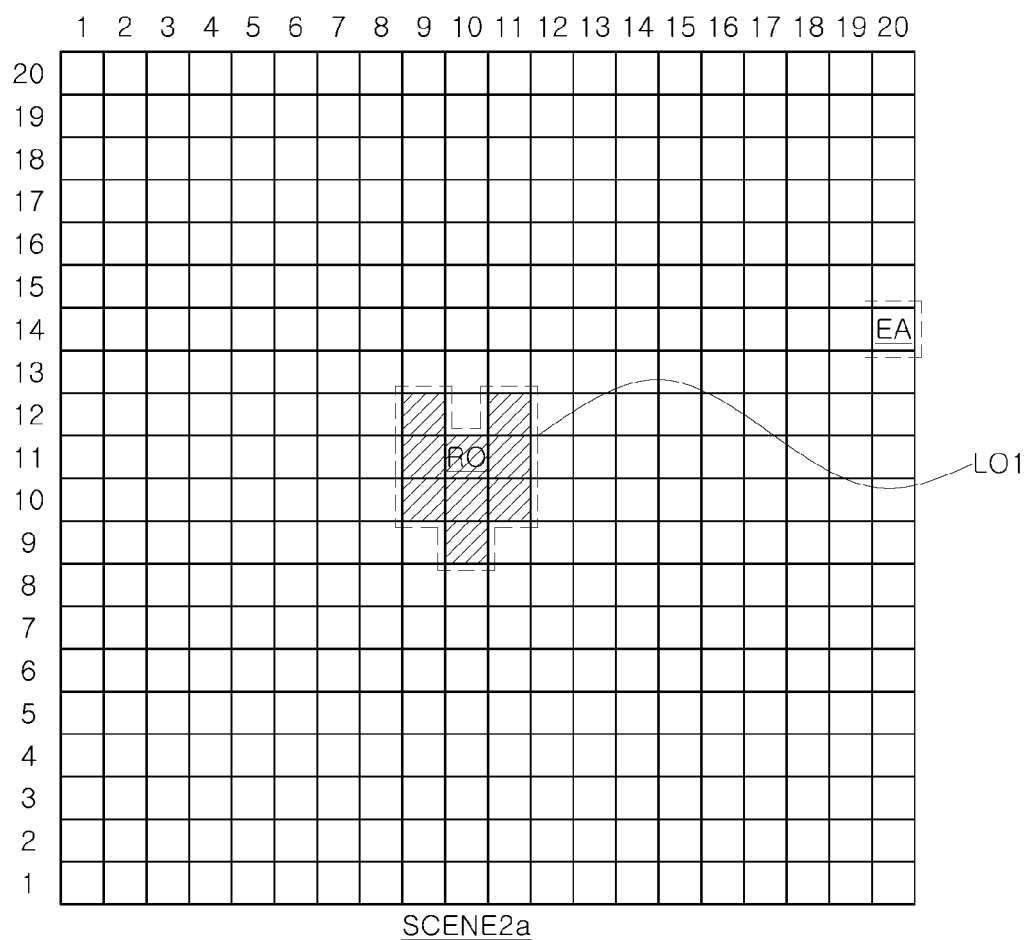
FIGS. 9 to 13 are diagrams illustrating a lighting effect directing method according to an expression stage, according to an embodiment of the inventive concept.

Referring to FIG. 9, reference coordinates RO, which is location information of an object origin on the coordinate plane, and a direction shape of expression level "1" that is directly adjacent to the reference coordinates and maintains a heart shape are shown in a scene SCENE2*a*. In FIG. 9, a receiving device corresponding to the reference coordinates RO and expression level "1", or a direction shape (i.e., a lighting object LO1) corresponding thereto are shown to have the same color. However, it is described that the receiving device and the direction shape emit light with different colors for each expression level.

Figure 10:
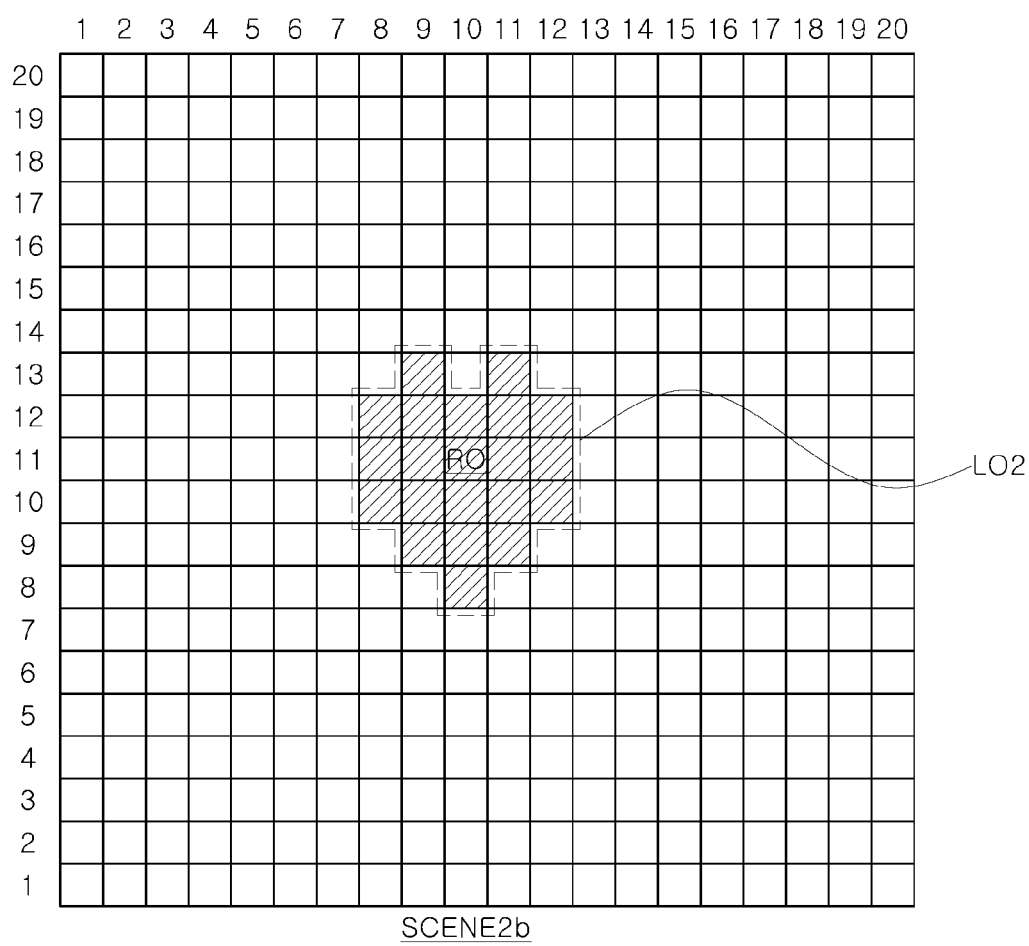

Referring to FIG. 10, the reference coordinates RO, a direction shape of expression level "1" that is directly adjacent to the reference coordinates and maintains a heart shape, and a direction shape of expression level "2" that is directly adjacent to the direction shape of expression level "1" and maintains a heart shape are shown in a scene SCENE2*b*. A lighting object LO2 indicates different light emissions from the receiving device depending on an expression level. However, it may be observed from the outside that the lighting object LO2 is controlled uniformly in a heart shape.

Figure 11:
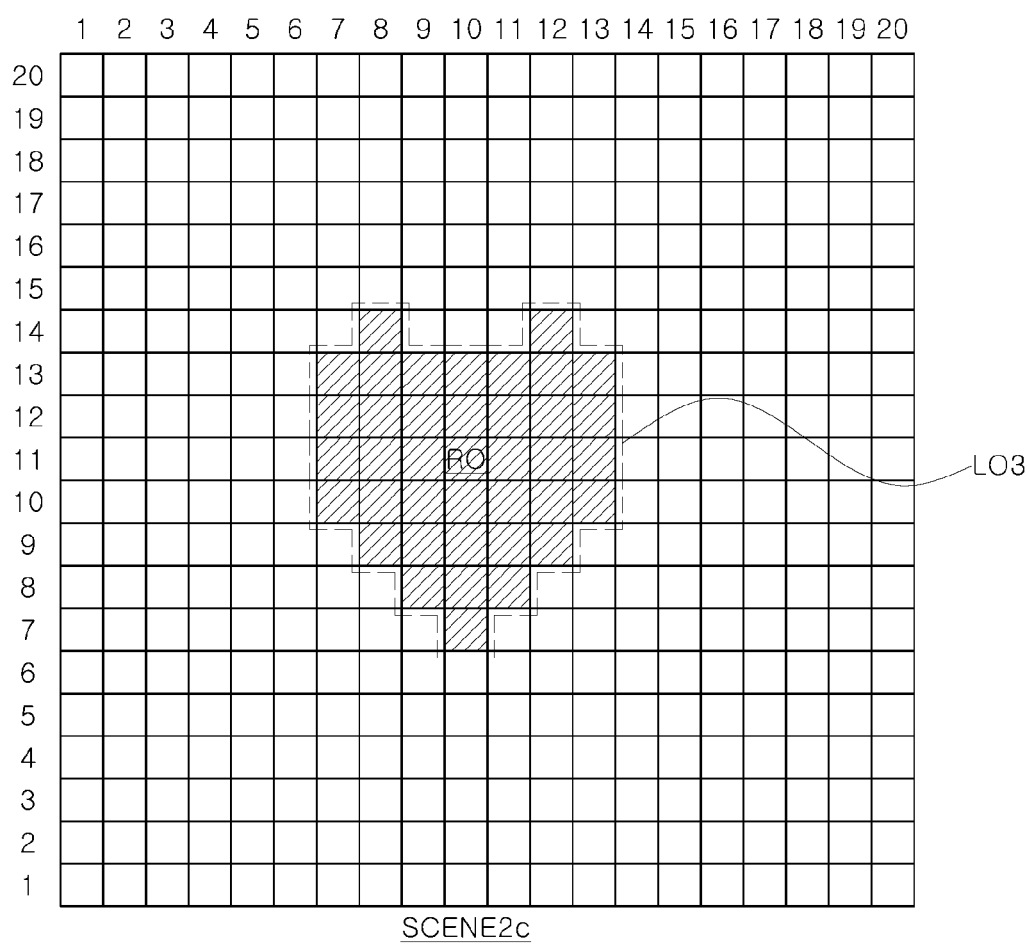

Referring to FIG. 11, the reference coordinates RO, a direction shape of expression level "1" that is directly adjacent to the reference coordinates and maintains a heart shape, a direction shape of expression level "2" that is directly adjacent to the direction shape of expression level "1" and maintains a heart shape, and a direction shape of expression level "3" that is directly adjacent to the direction shape of expression level "2" and maintains a heart shape are shown in a scene SCENE2*c*. A lighting object LO3 indicates different light emissions from the receiving device depending on an expression level. However, it may be observed from the outside that the lighting object LO3 is controlled uniformly in a heart shape larger than the lighting object LO2, or in one large heart shape.

Figure 12:
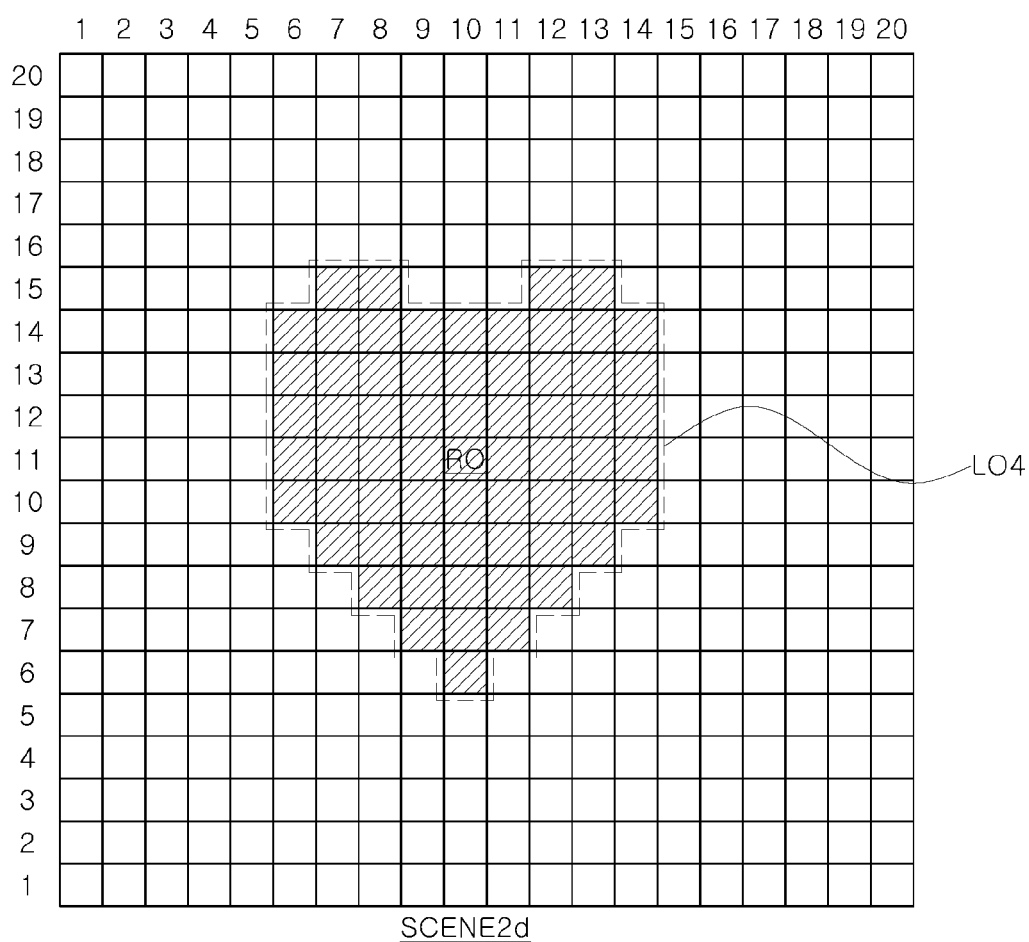

Referring to FIG. 12, the reference coordinates RO, a direction shape of expression level "1" that is directly adjacent to the reference coordinates and maintains a heart shape, a direction shape of expression level "2" that is directly adjacent to the direction shape of expression level "1" and maintains a heart shape, a direction shape of expression level "3" that is directly adjacent to the direction shape of expression level "2" and maintains a heart shape, and a direction shape of expression level "4" that is directly adjacent to the direction shape of expression level "3" and maintains a heart shape are shown in a scene SCENE2*d*. A lighting object LO4 indicates different light emissions from the receiving device depending on an expression level. However, it may be observed from the outside that the lighting object LO3 is controlled uniformly in a heart shape larger than the lighting object LO3, or in one large heart shape.

Figure 13:
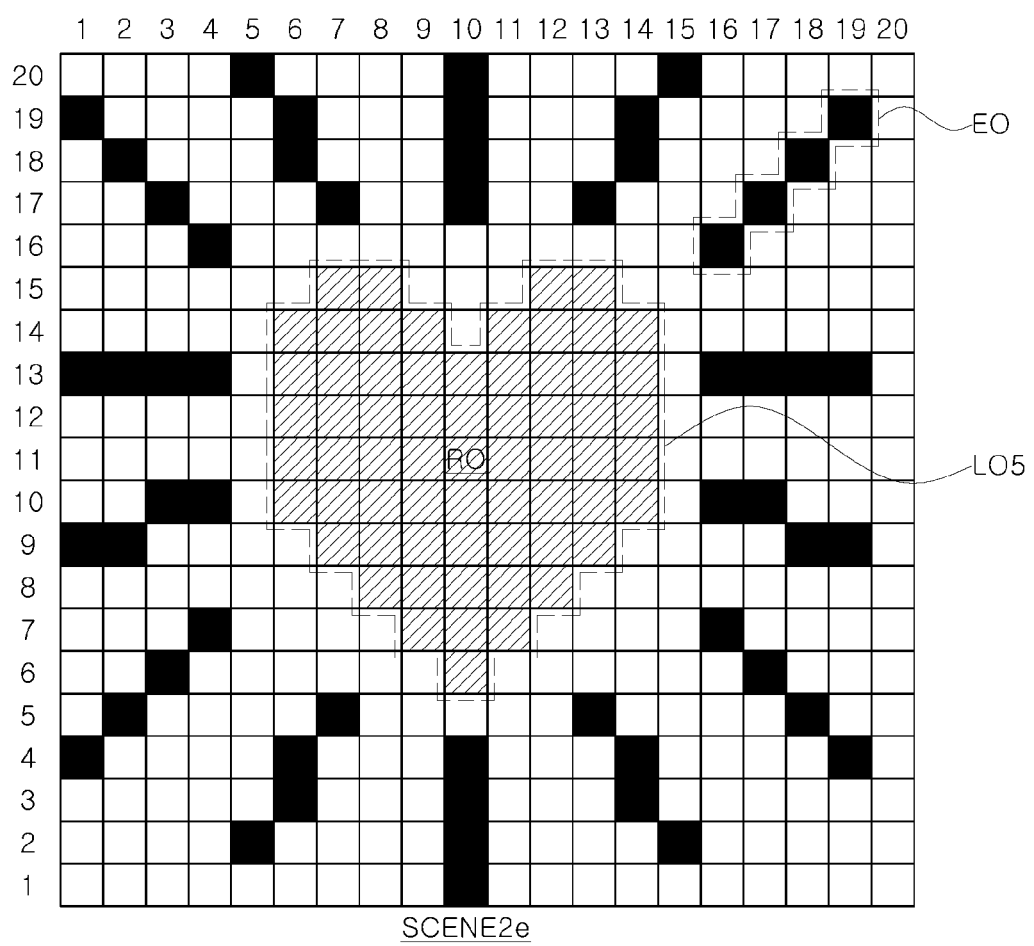

Referring to FIG. 13, the reference coordinates RO, a direction shape of expression level "1" that is directly adjacent to the reference coordinates and maintains a heart shape, a direction shape of expression level "2" that is directly adjacent to the direction shape of expression level "1" and maintains a heart shape, a direction shape of expression level "3" that is directly adjacent to the direction shape of expression level "2" and maintains a heart shape, a direction shape of expression level "4" that is directly adjacent to the direction shape of expression level "3" and maintains a heart shape, and a direction shape of expression level "5" that is directly adjacent to the direction shape of expression level "4" and maintains a heart shape are shown in a scene SCENE2e. A lighting object LO5 and an effecting object EO indicate different light emissions from the receiving device depending on an expression level. However, it may be observed from the outside that one large heart shape and an effect that decorates the heart shape are controlled uniformly.

Figure 14:
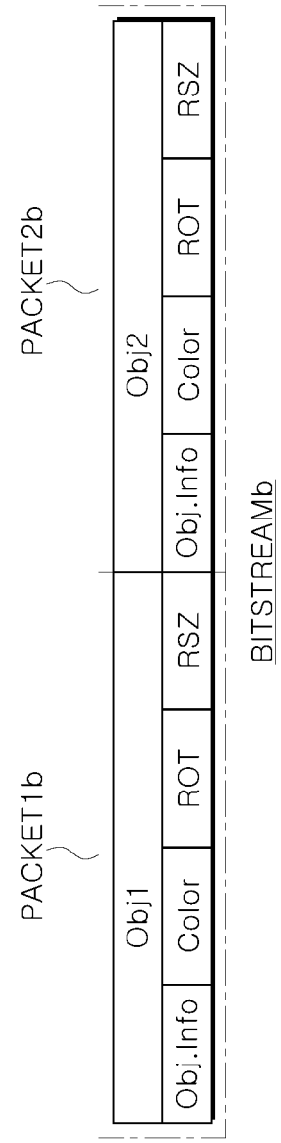
FIG. 14 is a structural diagram of a bitstream, according to an embodiment of the inventive concept.

FIG. 14 is a structural diagram of a bitstream BITSTREAMb, according to an embodiment of the inventive concept. FIG. 15 is a structural diagram of a control packet PACKET1b, according to an embodiment of the inventive concept. Descriptions of the bitstream structure diagram or the control packet structures diagrams of FIGS. 14 and 15 the same as descriptions of the structure diagrams disclosed in FIGS. 5 and 6 will be omitted to avoid redundancy.

Referring to FIG. 14, a first control packet PACKET1b may include the object information Obj.Info, the color information Color, rotation information ROT, and resizing information RSZ. Similarly, a second control packet PACKET2b may relate to a second direction object Obj2 and may include the object information Obj.Info, the color information Color, the rotation information ROT, and the resizing information RSZ.

The rotation information ROT refers to information for expressing a direction object by rotating the direction object. In an embodiment, the rotation information ROT may include a rotation conversion calculation value based on linear algebra. The receiving device 500 may rotate the direction object based on the rotation information ROT. In an embodiment, in addition to a rotation that takes a direction (i.e., a normal direction) perpendicular to a plane as a rotation axis, the rotation information ROT may represent another three-dimensional rotation. For example, the rotation information ROT may be used to perform various mathematical operation methods for expressing a pitch, roll, and yaw of the direction object. The receiving device 500 may rotate forward and backward and/or up and down the direction object.

The resizing information RSZ may convert the size of the direction object. In an embodiment, the resizing information RSZ may change the predetermined size (e.g., 20×20) of the direction object at a predetermined specific rate (i.e., horizontal and vertical lengths are different from each other) or a specific magnification (i.e., horizontal and vertical lengths are the same as each other).

In an embodiment, a precedence relationship or a priority relationship between the rotation information ROT and the resizing information RSZ may not be determined.

Referring to FIG. 15, the control packet PACKET1b may include the rotation information ROT and/or the resizing information RSZ as a part of the object information Obj.Info. In this case, magnification information and rotation information may have an expression range of 256 types (1 byte) having a value of 0 to 255.

In another embodiment, similarly to FIG. 14, the control packet PACKET1b may include the rotation information ROT and/or the resizing information RSZ as information separate from the object information Obj.Info.

FIG. 16 is a first mapping table including the resizing information RSZ, according to an embodiment of the inventive concept. FIG. 17 is a second mapping table indicating the rotation information ROT, according to an embodiment of the inventive concept.

Referring to FIG. 16, the first mapping table including the resizing information RSZ may have 256 expression ranges (1 byte), and may indicate a constant magnification for each data value. For example, when the resizing information RSZ indicates decimal number "127", the receiving device 500 may use the first mapping table as a lookup table, and may emit the light of a direction object with "original size" that is a magnification corresponding to "127". Similarly, when the resizing information RSZ indicates decimal number "132", the receiving device 500 may identify the magnification of "1.5 times" corresponding to the decimal number "132" based on the first mapping table, and may emit the light 1.5 times as large as the original size of the direction object.

Referring to FIG. 17, the second mapping table including the rotation information ROT may have 256 expression ranges (1 byte), and may indicate each data value is different by a specific angle. For example, when the rotation information ROT indicates the decimal number "0", the receiving device 500 may use the second mapping table as a lookup table, and may emit light of a direction object at an original angle depending on an angle corresponding to zero, and a sin value of zero corresponding thereto. Similarly, when the rotation information ROT indicates the decimal number "20", the receiving device 500 may identify the angle "30" and the sin value "0.5" corresponding to the decimal number "20" based on the second mapping table, and may rotate the direction object by 30 degrees.

Figure 18:
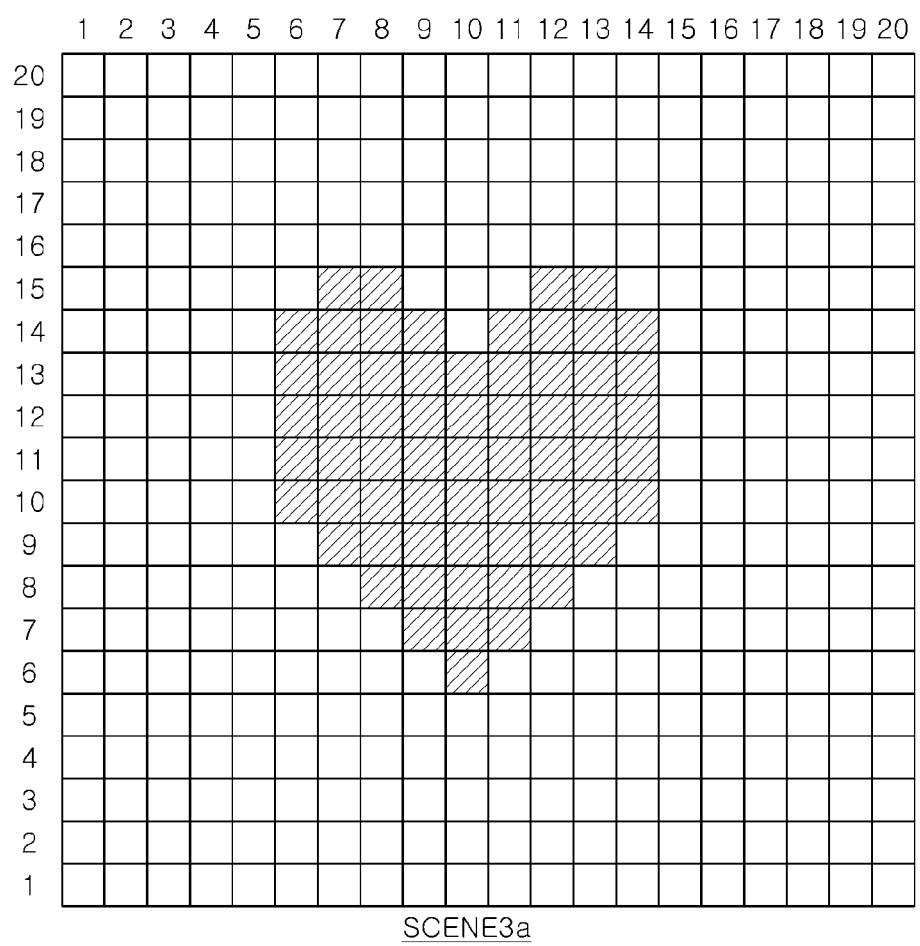
FIGS. 18 to 19 are diagrams illustrating a resized lighting effect directing method, according to an embodiment of the inventive concept.
Figure 19:
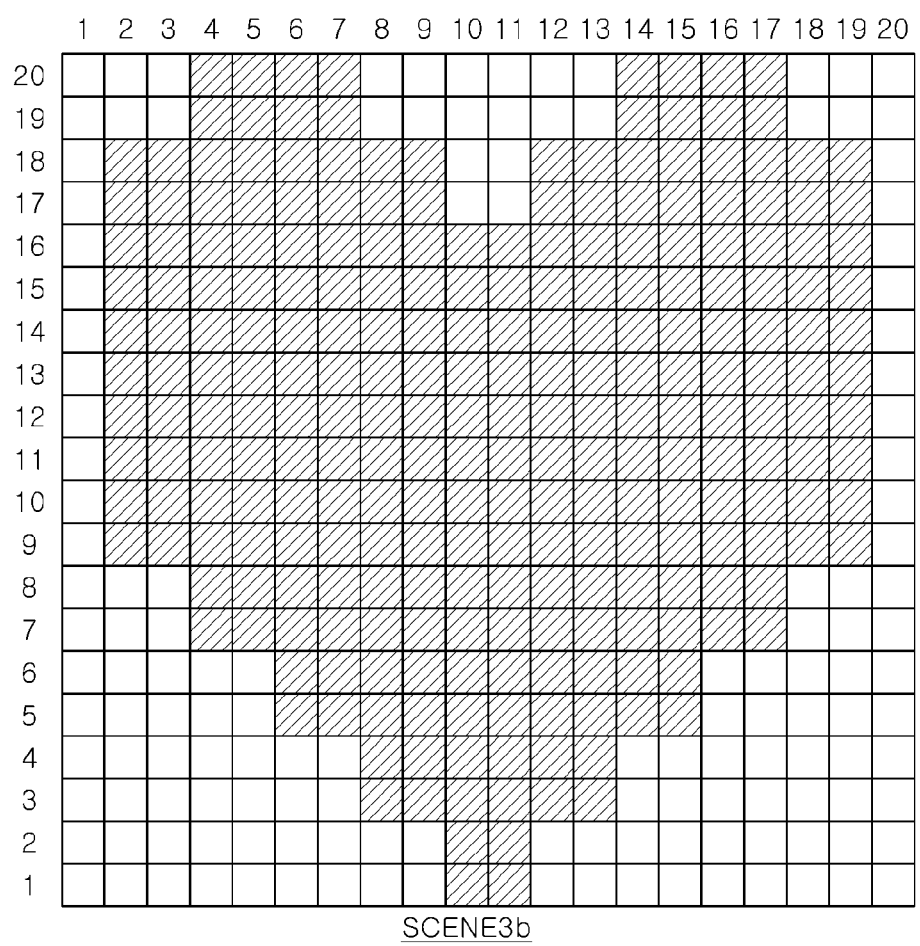

FIGS. 18 to 19 are diagrams illustrating a resized lighting effect directing method, according to an embodiment of the inventive concept. FIG. 16 will be referenced together.

Referring to FIG. 18, a scene SCENE3a may be a direction object of a heart shape. In an embodiment, the scene SCENE3a may be the totality of the reference coordinates RO, a direction shape of expression level "1" that is directly adjacent to the reference coordinates and maintains a heart shape, a direction shape of expression level "2" that is directly adjacent to the direction shape of expression level "1" and maintains a heart shape, a direction shape of expression level "3" that is directly adjacent to the direction shape of expression level "2" and maintains a heart shape, and a direction shape of expression level "4" that is directly adjacent to the direction shape of expression level "3" and maintains a heart shape.

Referring to FIG. 19, a scene SCENE3b may be a heart-shaped object, and the size of the scene SCENE3b may be resized compared to the heart shape in FIG. 18. In an embodiment, the receiving device 500 may further receive resizing information, and may direct the result of extending the direction object depending on the magnification indicated by the resizing information. In particular, in the scene SCENE3b, the receiving device 500 may not need to separately control the heart shape that fills a direction unit. A variety of direction objects may be represented by using only object information including reference coordinates and expression levels, and the resizing information RSZ. As such, the lighting effect directing method according to an embodiment of the inventive concept may achieve the direction having a high degree of freedom by directing the direction position, size, or rotation of an object during a performance direction in a performance hall.

Figure 20:
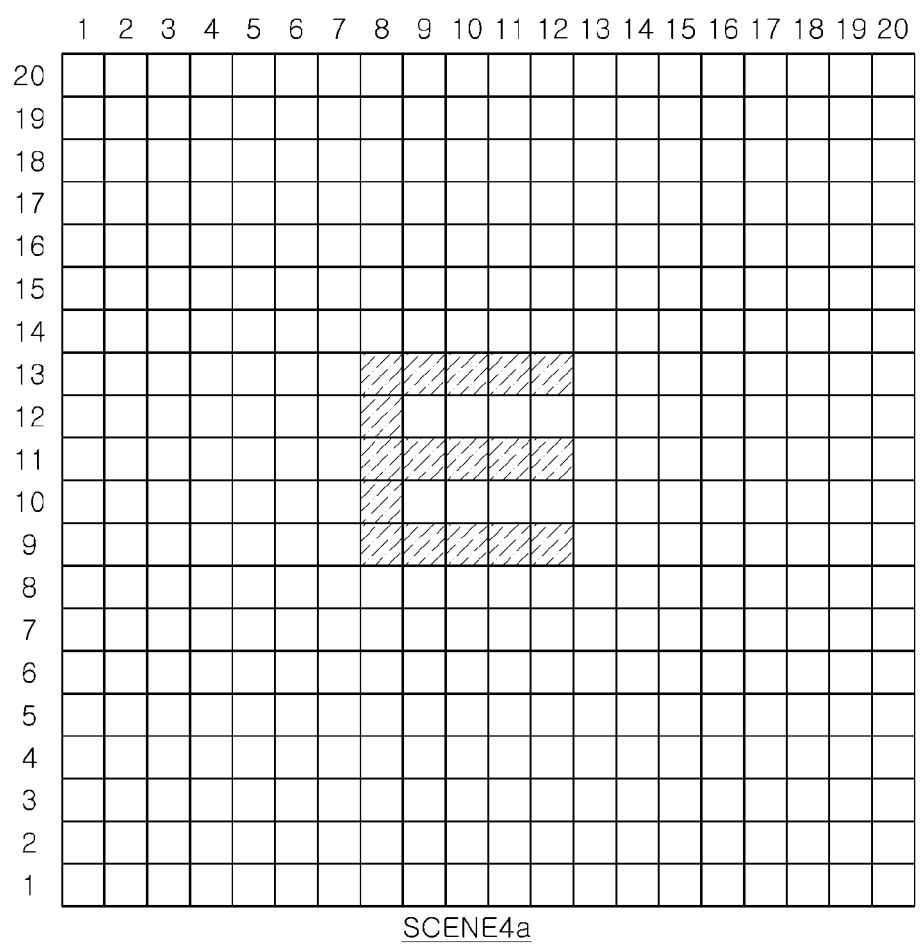
Figure 21:
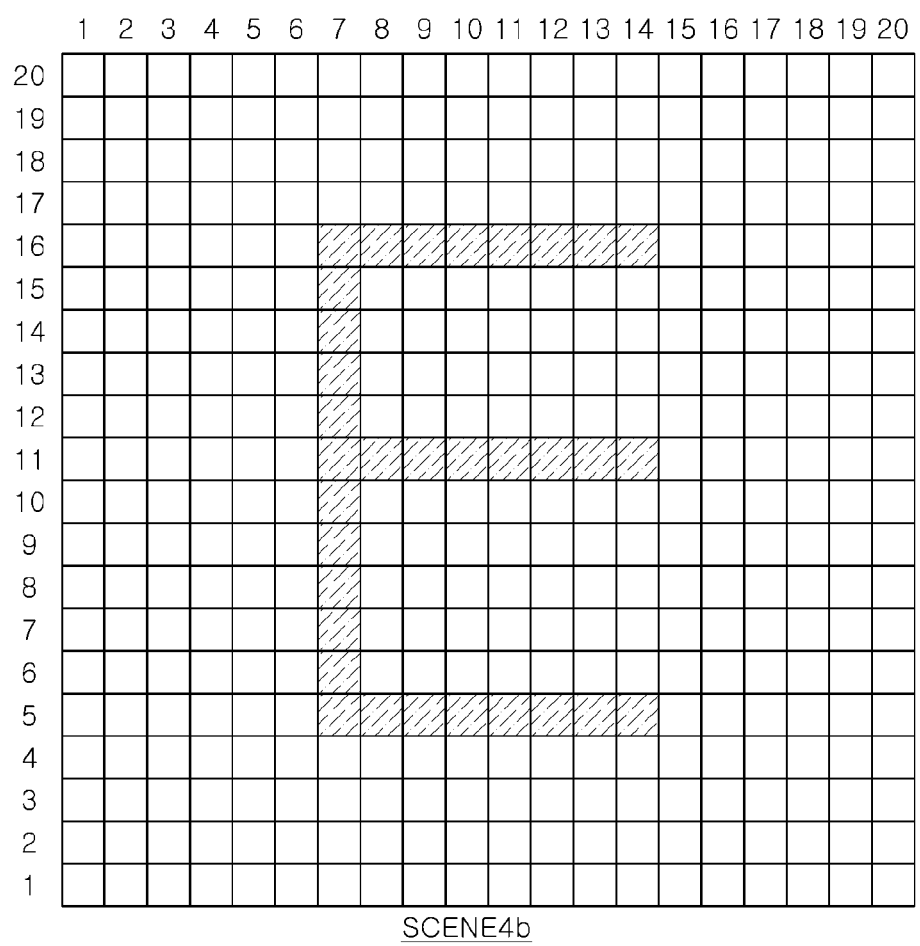
Figure 22:
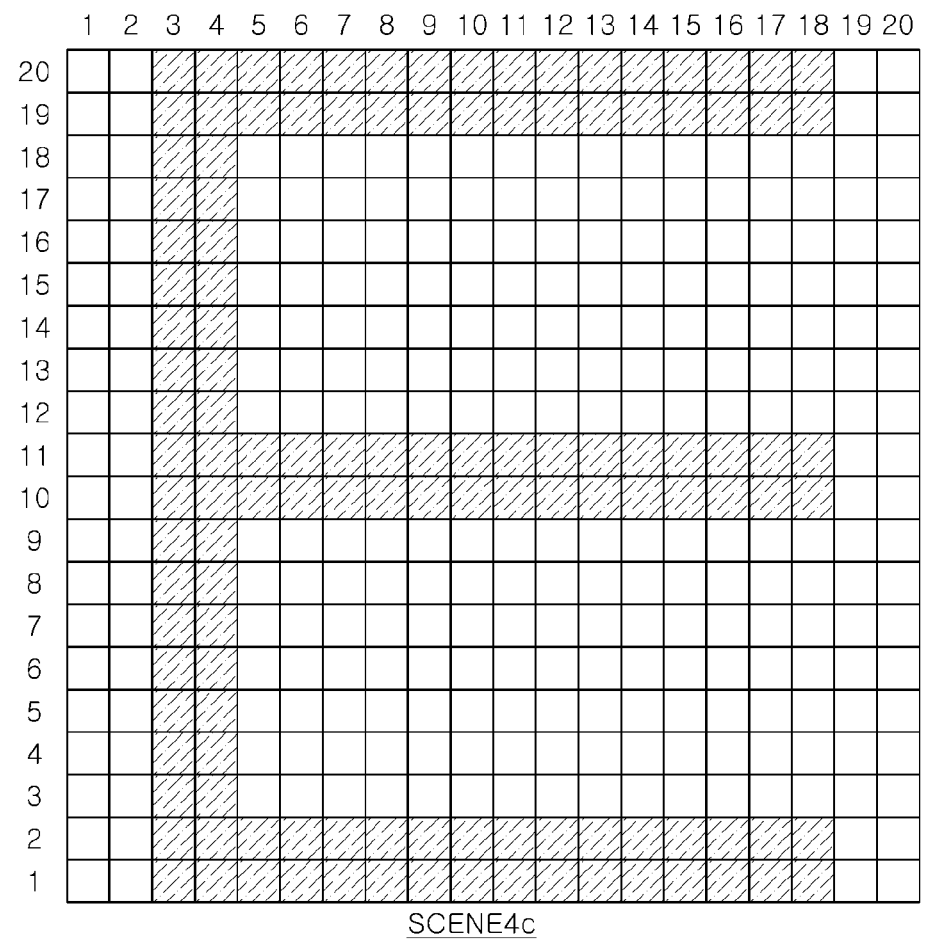

FIGS. 20 to 22 are diagrams illustrating a lighting effect directing method, according to an embodiment of the inventive concept.

A direction object may be a letter or font as well as an image. A direction object in a form of an image may be expanded and shrunk relatively freely. When a letter or a font is arbitrarily expanded and shrunk, a size thereof may be crushed, and it is difficult to perceive the letter or the font as a language.

According to an embodiment of the inventive concept, the predetermined shape of a direction object may be provided depending on a specific size, magnification, and ratio of the letter instead of shrinking or enlarging the letter. The provided direction object may be stored in advance in the receiving device 500 in FIG. 1.

Referring to FIG. 20, a shape obtained by reducing letter "E" may be stored as a predetermined direction object. Referring to FIG. 21, an original shape of the letter "E" may be stored as a predetermined direction object. Referring to FIG. 22, a shape obtained by enlarging letter "E" may be stored as a predetermined direction object.

Figure 23:
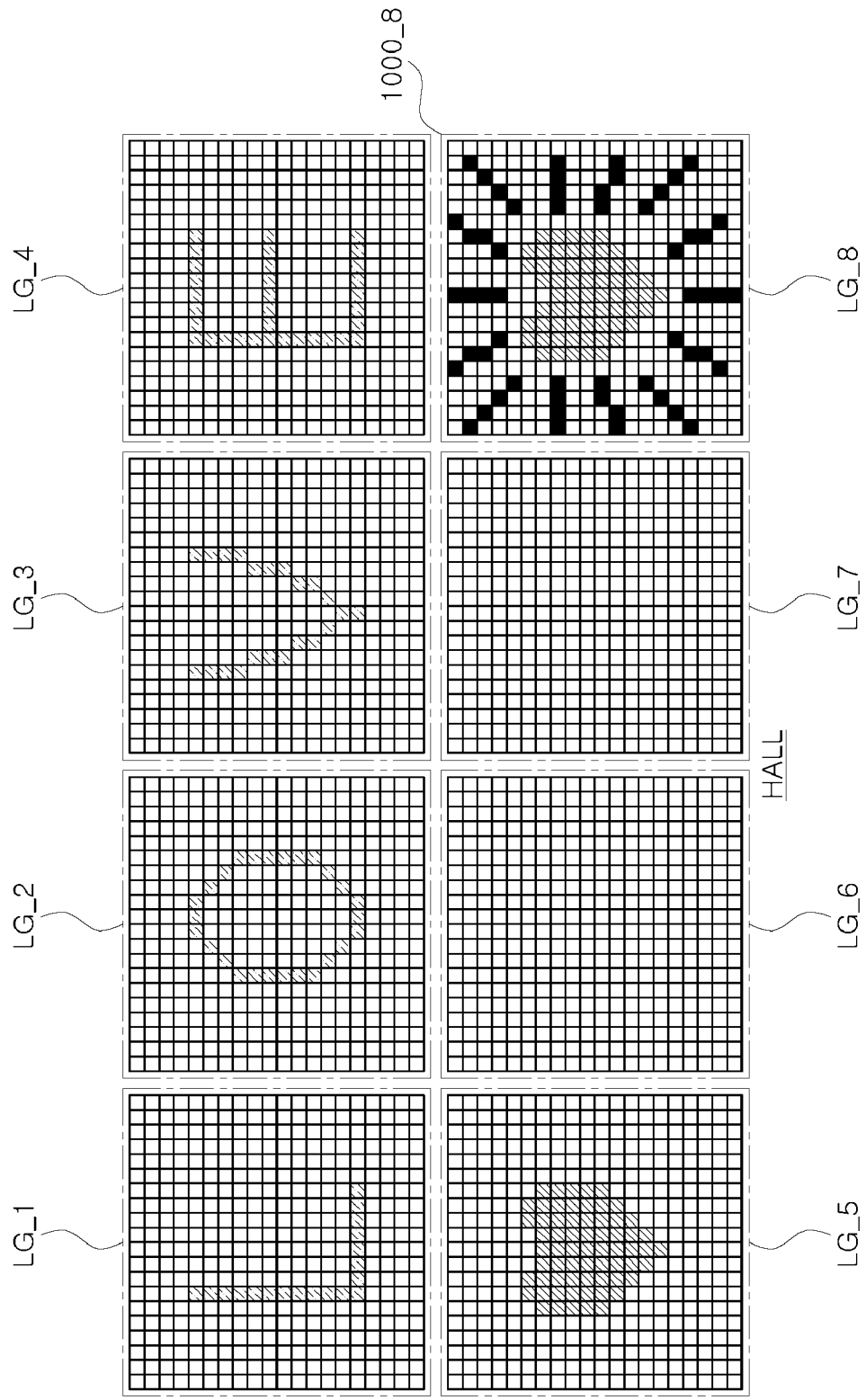
FIG. 23 is a diagram illustrating a part of seats in a performance hall in which a lighting effect is directed, according to an embodiment of the inventive concept.

FIG. 23 is a diagram illustrating a part of seats in a performance hall HALL in which a lighting effect is directed, according to an embodiment of the inventive concept.

Referring to FIG. 23, the performance hall HALL may include eight lighting groups LG_1 to LG_8, but is not limited thereto. For example, the eight lighting groups LG_1 to LG_8 may be partially set in parts of the performance hall HALL, or may be partially illuminated in parts. Moreover, a lighting group (one of LG_1 to LG_8) may be located in at least one of division areas obtained by dividing the performance hall into several parts. Furthermore, lighting groups (at least two of LG_1 to LG_8) may be located in two areas, which are separated from each other, from among the division areas obtained by dividing the performance hall into several parts.

In an embodiment, the first lighting group LG_1 may have a unit object of 20×20 (width×length), and may be controlled such that the direction object according to a reference object and an expression level has a direction shape of letter "L".

In an embodiment, the second lighting group LG_2 may have a unit object of 20×20 (width×length), and may be controlled such that the direction object according to a reference object and an expression level has a direction shape of letter "O".

In an embodiment, the third lighting group LG_3 may have a unit object of 20×20 (width×length), and may be controlled such that the direction object according to a reference object and an expression level has a direction shape of letter "V".

In an embodiment, the fourth lighting group LG_4 may have a unit object of 20×20 (width×length), and may be controlled such that the direction object according to a reference object and an expression level has a direction shape of letter "E". The fourth lighting group LG_4 may be implemented by substantially the same method as the direction shape of FIG. 21.

In an embodiment, the fifth lighting group LG_5 may have a unit object of 20×20 (width×length), and may be controlled such that the direction object according to a reference object and an expression level has a direction shape of a heart shape. At this time, an expression stage may be "4". The fifth lighting group LG_5 may be implemented by substantially the same method as the direction shape of FIG. 12.

In an embodiment, the sixth lighting group LG_6 and the seventh lighting group LG_7 have a unit object of 20×20 (width × length), and may be controlled such that the entire unit object is capable of being is a blank area.

In an embodiment, the eighth lighting group LG_8 may have a unit object of 20×20 (width×length), and may be controlled such that the direction object according to a reference object and an expression level has a direction shape of a heart shape. At this time, an expression stage may be "5". The eighth lighting group LG_8 may be implemented by substantially the same method as the direction shape of FIG. 13.

According to an embodiment of the inventive concept, one or more object origins of each of the plurality of lighting groups LG_1 to LG_8 in a performance hall may be set at a specific location of a lighting group. When a plurality of object origins of each of the plurality of lighting groups LG_1 to LG_8 are present, a control packet may further include an indicator that differently indicates an object origin of each lighting group.

For example, when the performance hall is divided into left and right areas, reference coordinates (0,0) of an object origin of the left area and reference coordinates (0,0) of an object origin of the right area may be present simultaneously. There is no problem when the left area and the right area are directed identically. However, when the left area and the right area are directed differently, the receiving device may not emit light with only a simple reference object (i.e., coordinate information of an object origin) depending on the intended scenario.

To overcome symmetrical limitations of coordinate values of each of the left and right areas, indicators indicating the left area and the right area may be further included in the reference coordinate of an object in the control packet.

As described above, it is described that the performance hall is divided into a left area and a right area, by way of example. For example, as well as dividing the performance hall into a left area and a right area, the performance hall is divided into an upper area and a lower area, or is divided into areas based on diagonal lines. An indicator for correcting an error for an area may be further included in the control packet.

Besides, according to an embodiment of the inventive concept, because directing direction objects based on reference coordinates, a lighting effect directing method may be represented by overlapping a plurality of direction objects, thereby causing a layer effect.

Besides, as compared to individually controlling the receiving device during a performance direction in the performance hall, the lighting effect directing method according to an embodiment of the inventive concept may efficiently use a frequency band and may reduce a delay time required to process a control signal including a control packet.

Also, unlike individually controlling each of a plurality of receiving devices, a lighting effect directing method according to an embodiment of the inventive concept may reduce the data size of a control signal transmitted wirelessly, thereby securing a fast response speed. Accordingly, the lighting effect directing method according to an embodiment of the inventive concept may simultaneously control a larger number of light emitting devices in real time compared to conventional technologies.

Steps or operations of the method or algorithm described with regard to an embodiment of the inventive concept may be implemented directly in hardware, may be implemented with a software module executable by hardware, or may be implemented by a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or a computer-readable recording medium well known in the art to which the inventive concept pertains.

Various embodiments according to an embodiment of the inventive concept may be implemented as software including one or more instructions stored in a storage medium (e.g., a memory) readable by a machine. For example, a processor (e.g., the processor 230 or 530) of the machine may call at least one instruction among the stored one or more instructions from a storage medium and then may execute the at least one instruction. This may enable the machine to operate to perform at least one function depending on the called at least one instruction. The one or more instructions may include a code generated by a complier or a code executable by an interpreter. The machine-readable storage medium may be provided in the form of a non-transitory storage medium. Herein, 'non-transitory' just means that the storage medium is a tangible device and does not include a signal (e.g., electromagnetic waves), and this term does not distinguish between the case where data is semipermanently stored in the storage medium and the case where the data is stored temporarily. For example, the 'non-transitory storage medium' may include a buffer in which data is temporarily stored.

According to an embodiment, a method according to various embodiments disclosed in the inventive concept may be provided to be included in a computer program product. The computer program product may be traded between a seller and a buyer as a product. The computer program product may be distributed in the form of a machine-readable storage medium (e.g., compact disc read only memory (CD-ROM)) or may be distributed (e.g., downloaded or uploaded), through an application store (e.g., PlayStore™), directly between two user devices (e.g., smartphones), or online. In the case of on-line distribution, at least part of the computer program product (e.g., a downloadable app) may be at least temporarily stored in the machine-readable storage medium such as the memory of a manufacturer's server, an application store's server, or a relay server or may be generated temporarily. Although an embodiment of the inventive concept are described with reference to the accompanying drawings, it will be understood by those skilled in the art to which the inventive concept pertains that the inventive concept may be carried out in other detailed forms without changing the scope and spirit or the essential features of the inventive concept. Therefore, the embodiments described above are provided by way of example in all aspects, and should be construed not to be restrictive.

Although an embodiment of the inventive concept are described with reference to the accompanying drawings, it will be understood by those skilled in the art to which the inventive concept pertains that the inventive concept may be carried out in other detailed forms without changing the scope and spirit or the essential features of the inventive concept. Therefore, the embodiments described above are provided by way of example in all aspects, and should be construed not to be restrictive.

A lighting effect directing method according to an embodiment of the inventive concept may control a plurality of receiving devices based on object origin, and thus may simultaneously control the plurality of receiving devices multiple times without including group information in the receiving devices.

Moreover, the lighting effect directing method according to an embodiment of the inventive concept may achieve the direction having a high degree of freedom by directing the direction position, size, or rotation of an object during a performance direction in a performance hall.

Furthermore, the lighting effect directing method according to an embodiment of the inventive concept may express direction objects based on an object origin, and thus may cause a layer effect by overlapping the plurality of direction objects.

Besides, as compared to individually controlling the receiving device during a performance direction in the performance hall, the lighting effect directing method according to an embodiment of the inventive concept may efficiently use a frequency band and may reduce a delay time required to process a control signal including a control packet.

Also, unlike individually controlling each of a plurality of receiving devices, a lighting effect directing method according to an embodiment of the inventive concept may reduce the data size of a control signal transmitted wirelessly, thereby securing a fast response speed. Accordingly, the lighting effect directing method according to an embodiment of the inventive concept may simultaneously control a larger number of light emitting devices in real time compared to conventional technologies.

Effects of the inventive concept are not limited to the effects mentioned above, and other effects not mentioned will be clearly understood by those skilled in the art from the following description.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A lighting effect directing method performed by a receiving device, the method comprising:
    determining coordinates of the receiving device at a seat based on seat information thus received;
    receiving and storing object data including a predefined direction shape and at least one expression level set to correspond to a size of the direction shape, and predefined color data;
    receiving a control packet including object information indicating the direction shape, an object origin of the direction shape, and the at least one expression level, and color information indicating a light emission color;
    determining a location relationship between the object origin and the determined coordinates of the receiving device, based on the object information; and
    performing a corresponding light emission operation such that the direction shape is expressed at the at least one expression level, based on the location relationship and the color information.

2. The method of claim 1, wherein the determining of the location relationship includes:
    determining the at least one expression level based on a distance between the object origin and the determined coordinates of the receiving device.

3. The method of claim 1, wherein the object origin is center coordinates of the direction shape, and
    wherein the determined coordinates of the receiving device is relatively determined based on the object origin.

4. The method of claim 1, wherein the at least one expression level is differentially determined depending on a distance from the object origin.

5. The method of claim 4, wherein the at least one expression level includes a first expression level determined within a predetermined distance from the object origin, and a second expression level determined outside the predetermined distance from the object origin.

6. The method of claim 5, wherein the receiving device includes a plurality of receiving devices, and
wherein a first receiving device, which has the first expression level, from among the plurality of receiving devices emits light in the same color as a second receiving device having the second expression level.

7. The method of claim 5, wherein the at least one expression level has a weight,
wherein the receiving device includes a plurality of receiving devices, which receive the control packet the same as one another, and processes the at least one expression level as the weight, and
wherein a first receiving device, which has the first expression level, from among the plurality of receiving devices receives the color information the same as a second receiving device having the second expression level, and emits light in a different color by the weight.

8. The method of claim 1, wherein the receiving device is provided with a first table in which a calculation value required for rotation conversion is mapped for each angle, and
wherein the control packet further includes first indication information indicating rotation of the direction shape.

9. The method of claim 1, wherein the receiving device is provided with a second table in which a calculation value required for the direction shape is mapped for each magnification, and
wherein the control packet further includes second indication information indicating a size change of the direction shape.

10. A non-transitory computer-readable recording medium storing a program to be combined with a computer and to perform the lighting effect directing method according to claim 1.

11. A lighting effect directing method of a lighting control system including a server, a lighting control device, and a receiving device, the method comprising:
transmitting, by the server, seat information;
determining, by the receiving device, coordinates of the receiving device at a seat based on seat information thus received;
generating, by the lighting control device, object data including a predefined direction shape and at least one expression level set to correspond to a size of the direction shape, and color data;
receiving and storing, by the receiving device, the object data and the color data from the lighting control device;
generating, by the lighting control device, a control packet including object information indicating the direction shape, an object origin of the direction shape, and the at least one expression level, and color information indicating a light emission color;
determining, by the receiving device, a location relationship between the object origin and the determined coordinates of the receiving device, based on the object information in the control packet received from the lighting control device; and
performing, the receiving device, a corresponding light emission operation such that the direction shape is expressed at the at least one expression level, based on the location relationship and the color information.

* * * * *